(12) United States Patent
Braitberg et al.

(10) Patent No.: US 7,913,270 B2
(45) Date of Patent: Mar. 22, 2011

(54) FIRST SURFACE REMOVABLE OPTICAL DISC WITHIN A CARTRIDGE

(75) Inventors: Michael F. Braitberg, Boulder, CO (US); Steven B. Volk, Boulder, CO (US); Gregory D. Volan, Longmont, CO (US); Ian R. Redmond, Princeton, NJ (US)

(73) Assignee: DPHI Acquisitions, Inc., Longmont, CO (US)

( * ) Notice: Subject to any disclaimer, the term of this patent is extended or adjusted under 35 U.S.C. 154(b) by 0 days.

(21) Appl. No.: 11/442,828

(22) Filed: May 30, 2006

(65) Prior Publication Data

US 2006/0294536 A1    Dec. 28, 2006

Related U.S. Application Data

(60) Division of application No. 10/891,173, filed on Jul. 13, 2004, now abandoned, which is a division of application No. 10/274,487, filed on Oct. 17, 2002, now abandoned, which is a continuation of application No. 09/315,398, filed on May 20, 1999, now abandoned.

(51) Int. Cl.
*G11B 23/03* (2006.01)
(52) U.S. Cl. ..................................... 720/736
(58) Field of Classification Search ............... 720/738, 720/739, 740, 741, 742, 743
See application file for complete search history.

(56) References Cited

U.S. PATENT DOCUMENTS

| 4,199,413 A | | 4/1980 | Miyakawa et al. | |
| 4,503,474 A | | 3/1985 | Nigam | |
| 4,660,175 A | * | 4/1987 | Strand | 365/113 |
| 4,744,055 A | * | 5/1988 | Hennessey | 365/113 |
| 4,876,667 A | * | 10/1989 | Ross et al. | 365/113 |
| 4,924,436 A | * | 5/1990 | Strand | 365/113 |
| 5,242,784 A | | 9/1993 | Chen et al. | 430/496 |
| 5,481,420 A | * | 1/1996 | Cardona et al. | 360/99.06 |
| 5,656,370 A | * | 8/1997 | Murakami et al. | 428/332 |
| 5,930,090 A | * | 7/1999 | Schick et al. | 360/133 |

FOREIGN PATENT DOCUMENTS

| EP | 0510889 A1 | 10/1992 |
| EP | 0907176 A2 | 4/1999 |
| EP | 0907176 A3 | 5/2001 |
| JP | 04335233 | 11/1992 |
| JP | 04349241 | 12/1992 |
| JP | 10049914 | 2/1998 |
| JP | 11066619 | 3/1999 |
| WO | 8793134 | 5/1987 |

* cited by examiner

*Primary Examiner* — David D Davis
(74) *Attorney, Agent, or Firm* — Haynes & Boone, LLP.

(57) ABSTRACT

A user-removable optical data storage system is provided. A rotatable first-surface medium is enveloped in a cartridge. The cartridge provides relatively large data capacity such as about 0.25 Gbytes or more despite a relatively small size such as about 35 mm×35 mm×3 mm. Preferably the cartridge substantially seals the data surfaces of the medium when the cartridge is withdrawn from a drive and at least a portion of one surface is automatically exposed to the objective of an optics arm when said cartridge is inserted in the drive. Tracking involves rotating an optic arm about an axis parallel to the disk rotation axis. Focus can involve pivoting the arm about an axis parallel to the disk surface.

6 Claims, 18 Drawing Sheets

FIRST SURFACE REMOVABLE OPTICAL DISC WITHIN A CARTRIDGE

CROSS-REFERENCE TO RELATED APPLICATIONS

This application is a divisional of U.S. patent application Ser. No. 10/891,173, filed Jul. 13, 2004, now abandoned which in turn is a divisional of U.S. patent application Ser. No. 10/274,487, filed Oct. 17, 2002, now abandoned, which in turn is a continuation of U.S. patent application Ser. No. 09/315,398, filed May 20, 1999, now abandoned.

TECHNICAL BACKGROUND

The present invention relates to a removable optical storage medium and in particular to an optical storage disk cartridge.

BACKGROUND INFORMATION

A number of disk-shaped optical storage media have been developed for use in storing various types of digital data in a manner such that the media can be readily removed from the mad/write or drive device for which it is designed. Common current (typically read-only) examples include the compact disk (CD) and digital versatile disk (DVD). Although these examples have been highly successful for particular applications, such as storing data for use on a personal computer (PC), or storing music or other audio or video information, such as motion pictures, these devices have proved less useful in situations where, for practical, historical or other reasons, an optical storage medium with a smaller size is preferable. One class of such application includes various personal electronic devices (PEDs). Personal electronic devices in general have a size, shape and weight such that it is feasible and convenient to carry or wear such devices on the person. Typically, to be practical, such devices need to be substantially pocket-sized (e.g., no more that about 100 mm, preferably no more than about 50 mm in the longest dimension, and preferably having at least one cross section no more than about 100 mm by about 50 mm, preferably no more than about 75 mm by about 35 mm) and/or a mass of about 12 oz (about ⅓ kg) or less. Examples of personal electronic devices include music reproduction equipment such as small tape players with headphones or MP3 players, cellular telephones, dictating equipment, digital cameras, at least some types of small computers, known as personal digital assistants (PDAs), and the like.

Owing, at least in part to the great popularity of personal electronic devices, and to the fact that certain personal electronic devices store (and/or utilize pre-stored) data there is a need for a data storage system and/or medium which is compatible with at least the size and weight constraints of personal electronic devices. Various types of storage systems have been used or proposed for some or all kinds of personal electronic devices, but have proved to be less than ideal for certain applications, e.g., in terns of storage capacity, size, power consumption, cost, and/or convenience.

One type of personal electronic device for which there is a continuing need for a practical data storage system is the digital camera (although the data storage system and medium of the present invention is also usable in many types of electronic devices, including, but not limited to, many types of personal electronic devices). Typically, users of digital (still) cameras prefer digital cameras which have a size, shape and weight which are not significantly greater than the size, shape and weight of conventional film cameras and accordingly, most digital cameras are too small to accommodate, for example, a CD-R (recordable compact disk) and/or DVD-sized optical media (having a diameter of 12 cm). Instead, typical digital cameras provide storage, within the camera, on storage media which are typically non-optical, such as on so-called flash memory or other electronic memory. Flash memories are non-archival in the sense that, in the absence of refreshing, the memory contents will degrade. As used herein, archival memory relates to memory which, without refresh or similar operations, is substantially free from data loss over an extended period, such as ten years or more. Although many flash memories are designed to be removable (i.e., removable by the typical end user during normal use), in view of the high expense of flash memory and in view of the relatively limited capacity of such flash memory or similar storage, some digital cameras are configured to accommodate downloading image data, from the flash or other electronic memory in the camera, to another storage device such as the hard drive of a personal computer, e.g., via a cable temporarily coupled between the camera and the personal computer. To store new images on the flash memory, flash memory is then refreshed, with loss of previously-stored images. Flash memory is re-writeable (i.e., is not a write-once medium) and its high cost makes it generally impractical to use flash memory as the medium to both capture and store (or archive) images (in a manner analogous to photographic film). Typically, once the on-board flash or other memory of a camera has been filled with image data, the photographer will either download some or all portions of the stored data (thus requiring ready access to, a personal computer, or other data storage device) or erase some or all of the stored images, typically in an irretrievable fashion it is believed generally undesirable to provide a system in which image data can (and/or, in practice, must) be erased, since this creates the potential for accidentally erasing images which were intended to be kept, and further requires taking active steps, such as downloading data to another medium, in order to retain or archive images. Accordingly, it would be advantageous to provide a system and storage medium usable in a digital camera in which images are stored in a substantially non-erasable fashion.

Furthermore, such a configuration for a digital camera departs significantly from the film camera paradigm, to which many photographers are accustomed, in which exposed film may be readily replaced with fresh film and in which developed "negatives" can be stored in a compact space, without the need for use of a separate apparatus such as a computer and without the need for performing two or more subsequent download operations, such as, in the case of a digital camera, from the camera to a PC and from the PC to a diskette or other removable storage medium.

The amount of data needed to store an image will vary depending, e.g., on factors such as image size, resolution (pixel density), color depth and the like. Currently, it is not uncommon for each image to represent about 6 megabytes of data which may be compressed (e.g., using MPEG2 compression) to about 1 megabyte of stored data. It is anticipated that consumer preferences for higher-quality images may drive this figure upward. A relatively large number of images are also involved in storing so-called video-still clips. Typically these require storing a video clip ten to thirty seconds in length, with images being taken at the rate of five to ten frames per second. Although it may be possible to provide a digital camera with a removable magnetic medium such as a magnetic diskette, such diskettes typically have severely limited capacity often providing storage for only a few, in some cases only about one, image. It is believed that a practical digital camera, especially in light of the film camera paradigm, to which many photographers are accustomed, will have the ability to store at least about twenty images, preferably at least about three dozen images, and possibly many more, on each removable medium unit. Accordingly, it would be advantageous to provide a system and storage medium usable in a digital camera which can store approximately twelve or more digital images, each image requiring about one megabyte or more of (possibly compressed) data In some systems, including magnetic recording systems, optical recording systems, and others, an attempt is made to achieve high data capacity by placing the read/write head (or objective) nearly in contact with the disk, such as less than about 0.025 to 0.05 micrometers. In these systems, sometimes referred to as solid immersion or evanescent systems, such close proximity of the read/write head to the disk typically requires an ultra-clean environment, since even sparse and/or very small particles or other contaminants can cause a potentially disastrous head crash, and in general it is believed such systems are inappropriate for removable-media applications. Accordingly, it would be advantageous to provide a system that can achieve high data density (such as about 0.25 Gbytes or more per recording surface on a 35 mm diameter or smaller disk) while maintaining a spacing between the read/write head or objective and the disk of at least about 50 micrometers.

Moreover, data transfer rates to magnetic storage media of the types used directly in digital cameras, such as floppy disks, are relatively low (so that the amount of time required to store data on magnetic media in a digital camera can be unacceptably long) and the rate of power consumption can be relatively high, leading to relatively short effective battery or charge lifetimes. Accordingly, it would be advantageous to provide a system and storage medium usable in a digital camera with increased transfer rates and/or decreased power consumption (e.g., compared to transfer rates and power consumption of typical systems using so-called floppy diskettes or other magnetic media).

Additionally, the cost, to the consumer, of electronic media may be relatively high such as about $4.00 for each one megabyte image, or more. Accordingly, it would be advantageous, particularly in light of the film camera paradigm, to which many photographers are accustomed, to provide a system and storage medium usable in a digital camera in which the cost, to the consumer, per image is reduced, e.g., compared to current electronic media used in connection with digital cameras.

In addition to the storage medium being advantageously sized for accommodation in a camera which is sized similarly to prior film cameras (such as typical 35 mm film cameras), it is believed also advantageous to provide a removable medium which is sized to facilitate handling and storage by typical consumers. It is believed that there is a practical lower limit on the size of such media, e.g., since units which are too small will be susceptible to being lost or misplaced and may be difficult for consumers to handle, particularly those with limited movement or disabilities. Thus, the removable media preferably are not substantially smaller than items which are generally near the lower limit of what may readily be handled, such as coins, stamps, and the like. Accordingly, it would be advantageous to provide a removable storage medium which is not significantly smaller, in width or length, than about an inch (i.e., not significantly smaller than about 25 mm). Additionally, the removable medium is advantageously not so large that it becomes cumbersome to store or transport, and preferably is sufficiently small that it can readily be held in a typical shirt pocket. Accordingly it would be advantageous to provide a removable storage medium which is not significantly larger, in width or length than about 3 inches, preferably not significantly larger than about 2 inches (about 50 mm). In contrast, the standard CD or DVD disk is about 4⅝ inches (about 120 mm) in diameter, which is believed too large to be accommodated in a pocket-sized camera or to be, itself, considered pocket-sized.

Accordingly, it would be useful to provide a data recording system which provides a removable medium, preferably non-erasable, with a high-transfer rate, lower power consumption and large capacity, but which is sized for effective and convenient consumer use (e.g., with largest dimensions about 25-50 mm) and so as to be accommodated in relatively compact digital cameras, such as digital cameras with a size, shape and/or weight not substantially exceeding that of corresponding film cameras.

Although relatively high data densities are desired, particularly for use in relatively small-diameter disks, many previous optical media are configured such that data densities are effectively limited in the data density that can be provided. Previous optical media typically provide an interior recording layer (which, as described below, is often a composite layer, made up of two or more thin films). Many common types of optical media are second-surface media, i.e., media in which the read/write beam traverses a relatively thick optically transparent layer before reaching the (possibly composite) recording layer. FIG. 7A illustrates one type of second-surface medium. In the illustration of FIG. 7A, a composite (multi-film) recording layer 710 includes a recordable dye or phase change film 712 (formed from any of a number of known materials), typically adjacent one or more dielectric films 714 (provided for thermal management, protection from oxidation or other environmental attack, and the like), coupled by an adhesion film 716 to one side of a transparent (at the read/write beam wavelength) layer 718 (such as glass, polycarbonate or other polymer). The interior 720 of the transparent layer 718 is opposite to the operational surface 722 where the read/write beam 724 first arrives. In this context, phase change refers to changes in the phase of the medium, such as changes between crystalline and amorphous phases (e.g., as opposed to electrical, optical or other waveform phase).

Many optical effects that are dealt with in the design of an optical storage system vary with the wavelength of the light involved, and accordingly, it is useful to discuss certain distances or thickness in terms of the number of wavelengths of the light being used for read/write operations. In the following, a distinction is made between longer distances, greater than about 50 wavelengths of the light, and smaller distances, such as distances less than about 50 wavelengths, or distances of about 10 or fewer wavelengths. Embodiments of the present invention are described, below, in connection with a system in which the wavelength of the light involved is about 650 to about 800 nm, so that structures with dimensions of about 130 micrometers or more are considered longer distances. In a second-surface medium, the transparent layer 718 is sufficiently thick (such as about 500 micrometers or more), that read/write operations are relatively insensitive to dust particles, scratches, and the like which are located more than 50 wavelengths from the recording layer (such that, considering the cone angle, there is little effect on shape or power of the light spot, by the time it reaches the recording layer), but can be relatively sensitive to various optical aberrations, owing to the fact that the read/write beam 724, after an aberration is created at the air/transparent layer interface, must propagate through a relatively longer distance (through the thickness of the relatively thick transparent layer 718) before reaching the recording layer 710, and must traverse the transparent layer 718 again after reflection, e.g., from reflective film 726 (which may be coupled to a lower, e.g., polymer, layer 728). Thus, the read/write beam 724 "sees" the transparent layer 718 before it arrives at the recording layer 710. In this way, the recording layer 710 is the second layer of the multi-layer medium 732 which the read/write beam reaches. In addition to the increased sensitivity to aberrational effects that arises from the relatively longer light propagation paths, many aberrational effects are exacerbated by the cone angle and tilt (non-perpendicularity of optical axis with respect to plane of recording medium). As a result many previous optical systems have used rail or similar linear guides for tracking, in order to avoid substantial beam tilt.

In optical storage utilizing marks written by laser in some recording material, storage capacity is limited by the minimum size of mark that can be written. This is set in turn by the minimum size of focal spot that can be generated by the laser and optical system. The minimum theoretical spot size is determined by the wavelength and numerical aperture or NA (i.e., cone angle) of the focusing beam. However, in practice, the optical system is always imperfect, e.g., due to manufacturing errors. For example, the final focusing lens (the objective) may have an imperfect shape due to polishing errors or, if injection molded, due to stresses in the mold. These errors result in optical aberrations which increase the spot size from ideal.

As noted above, in second-surface media, the presence of a relatively thick transparent layer 718 or substrate exacerbates a number of optical aberrations, including spherical aberrations (a phase error causing rays at different radii from the optic axis to be focused at different points), comma (creating a "tail" on the recorded spot when the transparent layer 718 is not perpendicular to the optical axis), astigmatism (creating foci along two perpendicular lines, rather than a symmetric spot) and/or birefringence (whereby different polarizations of light behave differently). In second-surface recording, the disk substrate itself (typically 0.6 mm or 1.2 mm of optical plastic) forms part of the optical train. Therefore, the substrate's properties are important, as well as the substrate's position relative to the optical system, particularly its angle of tilt. Such errors have a fractionally larger effect on spot size in systems where a larger NA is provided in an attempt to increase storage density. These errors have much greater effects on aberrations as the NA is increased. Thus, a given mechanical tolerance such as disk tilt will (in the absence of servo correction) place a limit on the NA that can be used, and hence on the storage density. Thus, the practical effect of the increase in aberrations resulting from second-surface media is to limit the NA, in turn, effectively limiting data spatial density.

Some or all of the aberrations arising from the presence of the thick transparent layer 718 can, at least theoretically, be partially compensated for by using lenses or similar optics, although these may undesirably increase the cost or degrade the performance of the system. Moreover, such compensating lenses typically can only provide such compensation for a single, pre-defined thickness of the layer 718. Because there are likely be to spatial variations in the thickness or other properties of the transparent layer 718, such compensation may be less than desired at some locations of the media.

Because the transparent layer 718 is typically formed from a non-conductive material, there is a significant risk that rotation or similar movement of the medium will create sufficient static electrical charge that dust particles or other debris may be attracted to (and/or become difficult to remove from) the operational surface of the medium.

Despite these and other difficulties associated with second-surface media, second-surface media are relatively widespread, especially for systems in which the media are unprotected by an enveloping cartridge or other device, at least in part because the recording layer is effectively isolated from dust, scratches and the like by the (relatively thick) transparent layer 718. Accordingly, it would be useful to provide a recordable medium which can avoid some or all of the disadvantageous aspects of second-surface media.

CDs, DVDs and similar optical storage media are typically provided as a single disk-shaped device, without the need for a cassette or other enveloping holder. The lack of an enveloping holder or cassette, while practical in the context of current data storage devices, music (or other audio) or motion picture (or other video) storage devices, also presents certain drawbacks which may be particularly acute for certain contemplated uses, such as digital camera and/or small-format (such as to fit in a digital camera) uses. Because CDs and DVDs are typically provided without a cassette covering, to protect the recording medium, CDs and DVDs are provided as second-surface media, i.e., one or more relatively thick (such as about 0.6 mm) and optically transparent, layers cover at least one surface of the CD-ROM or DVD. This protective layer is sufficiently thick that it exacerbates certain aberrations (and results in relatively high sensitivity to beam tilt) and thus, in terms of the optics of the system, the data recording layer of a CD or DVD is not the first surface of the disk which the read/write beam reaches. The need to accommodate the optical effect of the protective layer has consequences for the data density of a CD-ROM or DVD. Effectively, the data density provided in the CD or DVD is limited by the presence of a relatively thick protective layer. The presence of the relatively thick protective layer is, in turn, substantially dictated by the fact that the CD or DVD disk is otherwise unprotected, i.e., is not enveloped in a cassette or other covering. Rather, the relatively thick transparent layer 718 means that scratches, dust particles and the like are spaced sufficiently far from the recording layer that they are substantially defocused and occupy only a small portion of the incoming beam. Current optical storage devices such as DVD devices provide for storage of about 4.75 Gbytes of data in about 9366 mm' of surface. Since the data density which can be achieved in optical storage medium affects the physical size of the disk needed to achieve a given data capacity, second-surface media such as used in a CD or DVD would require quite close tolerance and high precision, and thus high cost, in fabrication of both the disk and the drive in order to provide high capacity, such as a capacity of 0.25 Gbytes or more per recording layer (if it could be done at all), in a disk small enough to be accommodated in a typical digital camera (such as a diameter of less than about 50 mm, preferably less than 40 mm). Accordingly, it would be useful to provide an optical data system which can achieve relatively small disk sizes, such as a disk diameter of about 50 mm or less, while achieving relatively high data capacities, such as a capacity of 0.25 Gbytes or more per side, preferably 0.5 Gbytes or more per side (e.g., in connection with a short wavelength "blue" laser"), at a relatively low cost, such as a cost, to consumers of about five dollars or less per 250 megabytes of data storage capacity.

Much of the development of optical disk data storage has centered around apparatus in which the read/write mechanism was configured to position a read/write beam, at a desired radial location on the disk in a substantially linear fashion (so-called linear actuators). While linear actuators have proved useful in a number of contexts such as for reading/writing, CDs and DVDs, the location of the masses of components in such linear actuators has typically been so as to affect performance parameters such as access time, data transfer rates, and the like. These factors can, in turn, have an effect on the price, for a given level of performance, for such devices. In general linear actuators are relatively high-friction devices and require precise track alignment. Linear actuators typically add substantial thickness to a read/write or drive device and generally do not scale well toward miniaturization. Thus linear actuators have, in general, found greatest use in applications where thickness, access time, bandwidth and power consumption are of less importance, and typically are used in situations where the moving read/write head is relatively massive. Accordingly, it would be useful to provide a optical data-storage medium and/or cartridge configured to accommodate a non-linear, such as a rotary, actuator.

Although the size, shape and weight of removable media for a digital camera can be of importance in the success of a digital camera, the configuration of the removable media (and enveloping cassette) is strongly tied to the configuration of the read/write device (the "drive") including by such factors as rotation speed, actuator speed, and path, insertion/removal devices or methods and the like. Accordingly, it would be useful to provide a removable optical storage medium (and/or enveloping cartridge) configured for use in connection with a drive or read/write device which is, preferably, relatively low in cost, small, and lightweight.

SUMMARY OF THE INVENTION

The present invention includes a recognition of the existence and/or nature of certain problems in previous systems, including those discussed herein. The present invention provides a removable optical data recording cartridge which is configured to have relatively high capacity and relatively low weight, size and cost. In one aspect, the system includes writeable media and, preferably, an optical disk cartridge is configured for use in connection with a rotary actuator for data reading and writing. The system can be used in a number of manners including as part of a system for capturing and/or recording data (such as in a digital camera, audio or video recorder, and the like), as part of a system for playing or otherwise outputting data (such as displaying recorded or "pre-recorded" images, video, audio or other information) or combinations thereof. According to one feature of the invention, the medium is a first-surface medium protected by an enveloping cartridge. Preferably the medium can be configured for recording on both surfaces and the cartridge is configured to permit actuator access through either of two opposed cartridge surfaces. The read/write surfaces of the disk are substantially sealed when the disk is removed from the drive.

In one aspect of the invention, a user-removable optical data storage cartridge is provided. The system can provide relatively high data densities, including densities similar to those found in DVD systems (about 2.6 Gbit per square inch of data surface) as well as higher data densities such as about 4 Gbits per square inch or more. The system provides relatively large data capacity such as about 0.25 Gbytes or more despite a relatively small size such as about 35 mm×35 mm×3 mm. In one aspect, the medium is a first-surface medium. Preferably the cartridge substantially seals the data surfaces of the medium when the cartridge is withdrawn from a drive and at least a portion of one surface is automatically exposed to the objective of an optics arm when said cartridge is inserted in a drive.

DETAILED DESCRIPTION OF THE PREFERRED EMBODIMENTS

Figure 1:
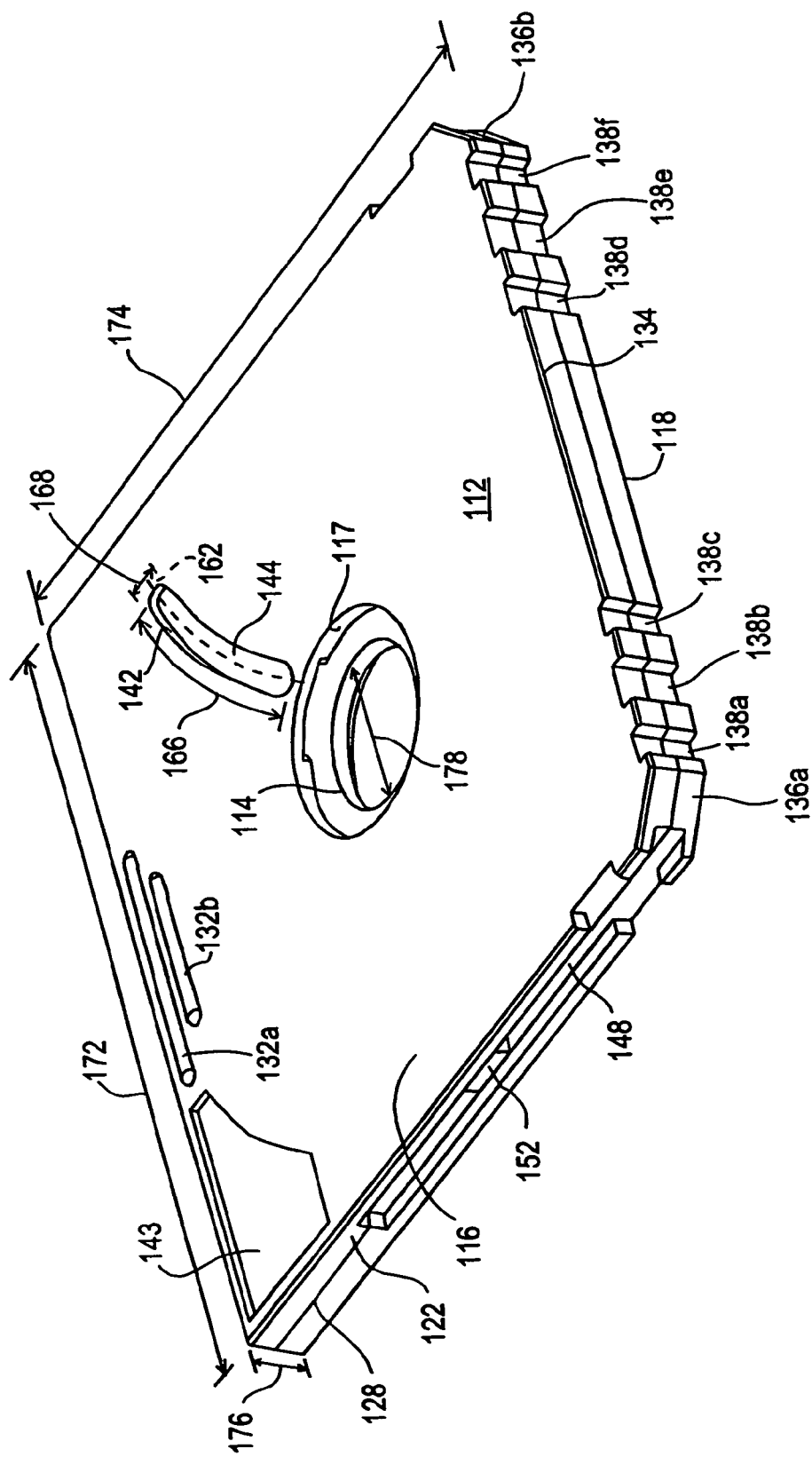
FIG. 1 is a perspective view of an optical recording cartridge according to an embodiment of the present invention.
Figure 8:
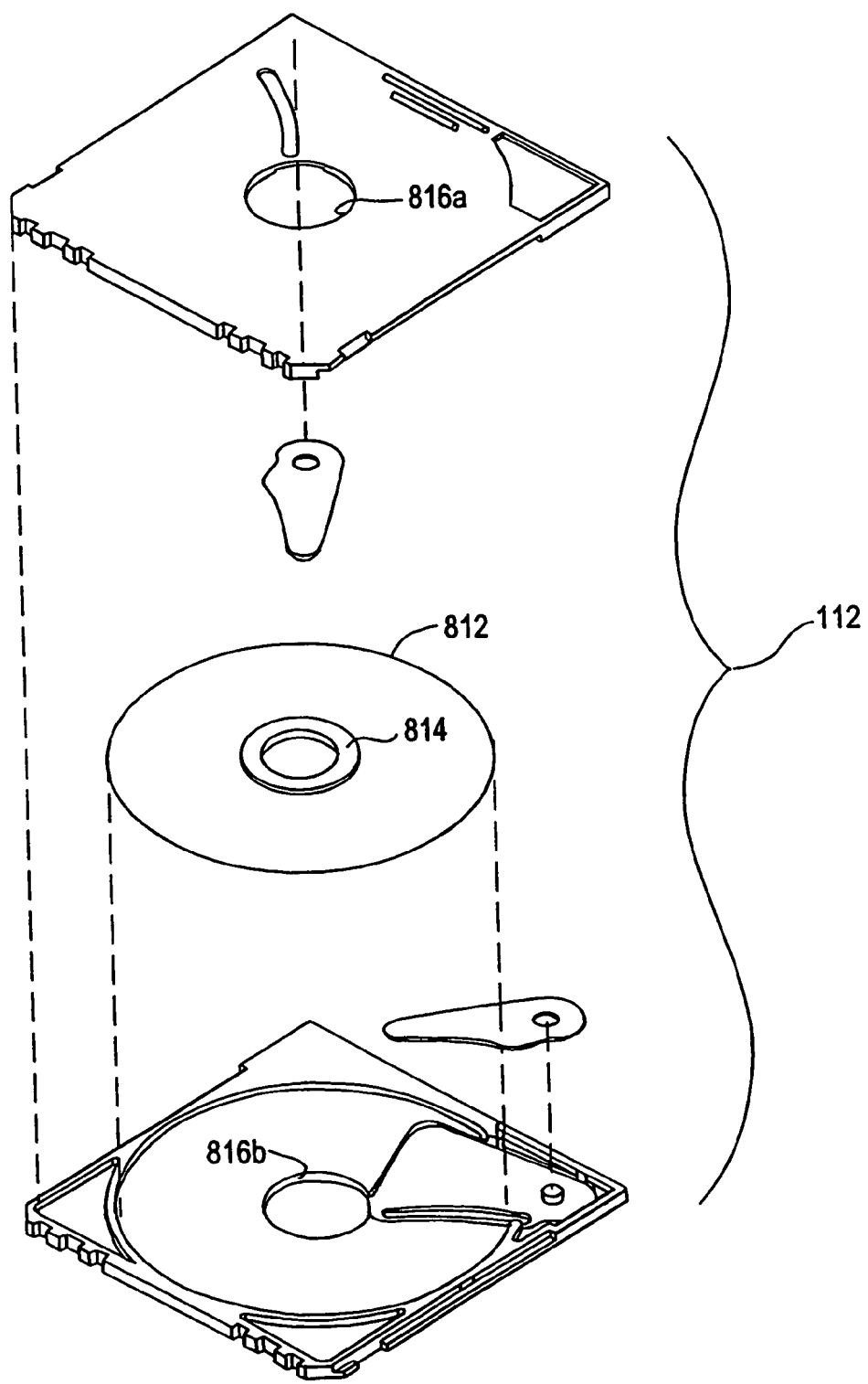
FIG. 8 is an exploded top perspective view of a cartridge for use with hubbed media in connection with an embodiment of the present invention.

As shown in FIG. 1, according to one embodiment, a removable, recordable optical storage cartridge 112 includes a rotatable writeable optical storage disk 114 surrounded by a cartridge body having an upper wall 116 and a lower wall 118 joined by a substantially rectangular side wall 122. In one embodiment, the medium is an InSbSn phase change medium, of a type used by Kodak, in connection with 14 inch optical write-once-read-many (WORM) disk products. Examples of suitable media are described in U.S. Pat. Nos. 4,960,680 and 5,271,978. Such a medium is suitable as a first-surface medium. Such a medium is substantially panchromatic or "broadband," such that it can be used with a range of laser light frequencies (e.g., from 400 nm or less to 1100 nm or more wavelength), making it possible to use the invention described herein in connection with short-wavelength lasers (e.g., blue lasers), to achieve a smaller spot size (and thus higher data density) substantially without the need to modify the medium It is anticipated that a disk 114 formed using such a medium will be substantially rigid. Another example of a medium that can be used in embodiments of the present invention is that described in U.S. Pat. No. 4,816,841 of Kurary Plasmon Data Systems Co., Ltd., which is an example of a medium with a plastic substrate. Non-rigid media may, in some embodiments, be adhered to (or otherwise coupled to) one or both surfaces of a rigid substrate to provide a rigid, compound medium, or may be coupled to a semi-rigid substrate (to provide a semi-rigid, compound medium) or left uncoupled to a substrate to provide a non-rigid medium. As depicted in FIG. 8, if the cartridge 112 is used in connection with a non-rigid or semi-rigid film-type disk, 812, the disk 812 is preferably provided with a separate hub 814 to define the center (e.g., for minimizing run-out). The hub 814 can also be useful in providing a seal between the central opening of the cartridge 816x, 816b and the disk 812, e.g., to avoid contact with or contamination of the data-bearing portions of the disk 812.

Figure 13:
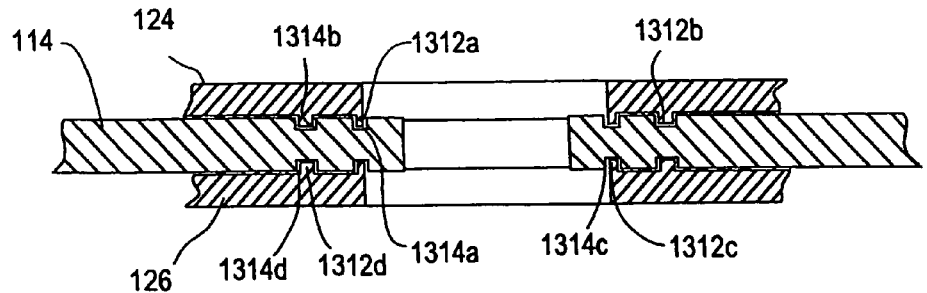
FIG. 13 is a partial cross-sectional view through the central portion of a disk and cartridge, according to an embodiment of the present invention.

FIG. 13 depicts one manner of avoiding entry of dust particles and the like into the interior of the cartridge via the hub area. In the embodiment of FIG. 13, an annular labyrinthine seal is formed between the hub region of the disk 114 and the interior surfaces of adjacent regions of the upper 124 and lower 126 cartridge components. In the depicted embodiment annular tongues 1312a, 1312b, 1312c, 1312d extending inwardly from interior surfaces of the upper 124 and lower 126 cartridge components interdigitate with complementary annular grooves 1314a, 1314b, 1314c, 1314d formed in the hub region of the disk 114. Other labyrinth configurations can be used, such as providing tongues on the disk and grooves in the cartridge, providing maze-like lateral interdigitations and the like can also be used. Without wishing to be bound by any theory, it is believed that labyrinths can be constructed to provide an effective path which is sufficiently long and contorted that it is statistically unlikely that a particle, of a size commensurate with or larger than the objective-to-medium distance, can penetrate the seal, e.g., considering factors such as the mean free path for the expected size/mass of particles, expected air flow patterns and the like. If desired, the shutter system 144a, 144b can be configured to cover the central opening 816a, 816b when the cartridge 112 is removed from the drive to further or alternatively protect against entry of particles via the central opening. Preferably, the objective is spaced at least about 50 micrometers from the operative surface of the disk.

Figure 7A:
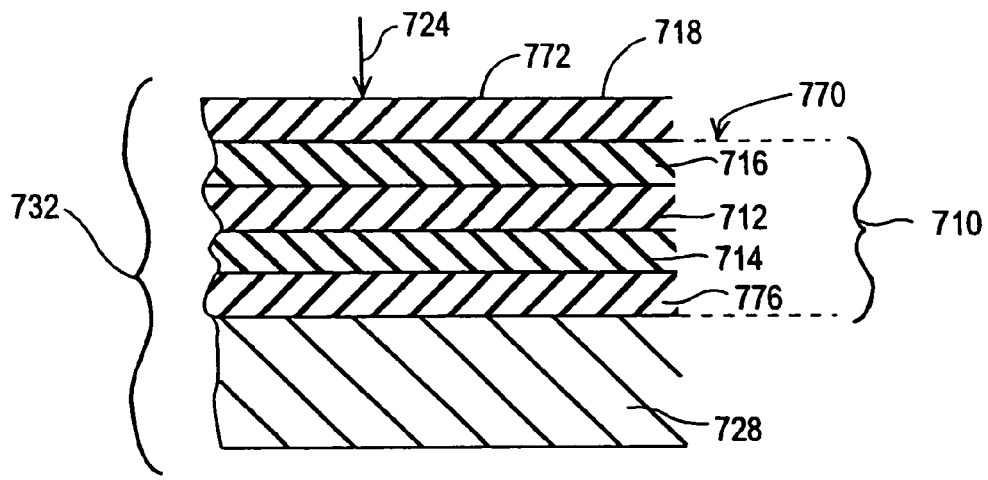
FIGS. 7A, 7B and 7C are cross sectional views through illustrative configurations of second-surface and two embodiments of first-surface media, respectively.
Figure 7B:
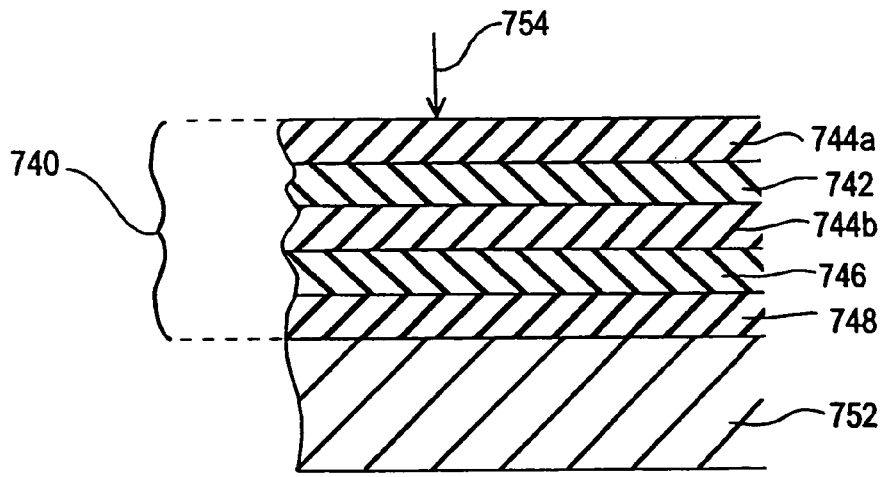

Preferably, the medium is configured as a first-surface medium. In a first-surface medium, such as depicted in FIG. 7B, the (possibly composite) recording layer 740 is the first layer reached by the read-write beam. The recording layer "stack" 740 is thin compared to the substrate on which it is deposited. The stack thickness is typically only <$\mu$m to 10's of $\mu$m thick, compared to a substrate thickness typically in the range 300-1200 $\mu$m.

Figure 7C:
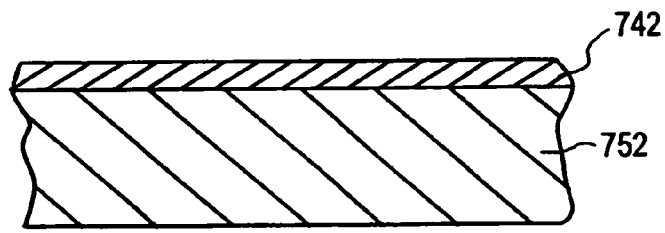

As illustrated in FIG. 7C, in one embodiment, a recording film 742 may define an outermost surface of the disk, such as when the disk is formed by placing a recording film directly on a substrate 752, so that the read/write beam does not pass through any portion of the disk prior to reaching the recording film 742. In the depicted embodiment, the recording layer is made up of the single film 742. If desired, a thin coating (such as a few molecules thick) of carbon or other wear-resistant material (not shown) can be deposited on the exterior surface of the film 742. The configuration of FIG. 7C may be feasible, e.g., when the material of the film 742 has sufficient adhesion to the substrate 752, and/or has acceptable thermal characteristics and the like. In other embodiments, it may be desired to provide a recording layer which has additional films, such as depicted in FIG. 7B.

In the embodiment of FIG. 7B, the read-write beam traverses film 744a of the multi-film, composite recording layer 740 before reaching the recordable dye or phase change film 742. In other embodiments, the beam may traverse two or more films before reaching the recordable film 742. Preferably, films which are traversed before reaching the recordable film 742 are sufficiently thin, such as equal to less than about two wavelengths (e.g., 100 nm or less, preferably less than about 50 nm, for 650-800 nm light), that aberrations (e.g., of the type discussed above in connection with the thick transparent layer 718 of the second-surface medium) arising from or exacerbated by the presence of the film 744a are sufficiently small that there is little need to consider such aberrations when designing the read-write beam path. In this sense, the recording layer 740 is effectively the "first surface" reached by the read-write beam. Because the film 744a through which the beam 754 must pass before reaching the recordable film 742 is relatively thin, the first-surface medium of the present invention, including that illustrated in FIG. 7B, avoids or reduces the optical aberrations and other disadvantageous aspects of second-surface optical data storage media, including those that were described above, such as spherical aberrations, comma, astigmatism and/or birefringence. Since, as described above, the effect of errors such as disk tilt depends on the substrate thickness, first-surface recording can significantly reduce the effect of these errors and allow the NA and density to be increased. Further, there is relatively less power loss in the first-surface system of FIG. 7B (compared, e.g., to a second-surface system such as that described above in connection with FIG. 7A.). The dielectric film 744a is sufficiently thin that there is little effect on beam focus. As a result, it is possible to achieve relatively small spot size (and thus relatively high areal data density), at a reasonable cost.

The ability to achieve a relatively large data capacity on a small disk is also advantageous in that the relatively small (rotational) moment of inertia of a small disk means that the power consumption of the device is lowered. The power required to accelerate the disk to the desired spin velocity (in a desirably short spin-up time), or to decelerate the disk, if needed, e.g., to provide a desired speed at a given radial location, is lower for a smaller and less massive disk.

Although many configurations of first-surface media can be used in the context of the present invention, FIG. 7B provides an example of one configuration. In the illustration of FIG. 7B, a (multi-film) recording layer 740 includes a recordable dye or phase change film 742 sandwiched between two dielectric films 744a, 744b. A reflective film 746, adjacent the sandwich 744a, 742, 744b, is coupled by an adhesion film 749 to a substrate 752. In the illustration of FIG. 7B, the upper surface of the upper dielectric film 744a defines the operational surface of the recording layer 740, i.e., is initially struck by the read/write beam 754. If desired, a thin coating (such as a few molecules thick) of carbon or other wear-resistant material (not shown) can be deposited on the operational surface of the medium.

Preferably, the films making up the recording layer 740 (such as films 742, 744a, 744b, 746 and 748, in the illustration of FIG. 7B) are relatively thin, such as less than about 100 nm each, preferably less than about 50 nm. The recording layer 740 is less than about 1000 am thick, preferably less than about 400 am, and may be as thin as about 20 nm or less.

The recordable medium film 742 can be formed of a number of materials. In various embodiments, the recording film is preferably thermally-written and optically-read and may be write-once, such as a phase-change material, (for example, TeO or a chalcogenide alloy, e.g., InSbSn) or a dye (for example cyanine or pthalocyanine-dye) or it may be erasable and re-recordable, such as other phase change materials (GeTeSb) or magneto-optical. It is also possible to use an optically written medium. A number of optically-written materials are known, a common example being photographic film. In at least one embodiment, the recordable medium film 742 is substantially electrically conductive, so that static charges will tend to be dissipated, rather than contributing to unacceptable build-up of dust particles or other debris. Preferably, reading of information recorded in the recording layer is done reflectively, i.e., the light signal reflected from the stack is monitored and used for all signals, such as servo feedback and power adjustment, as well as for readout of the data. The thickness of the recordable medium film 742 is selected depending on a number of factors such as absorptivity, transparency, thermal properties and the like.

In one embodiment, the recording film 742 is deposited directly on the substrate 752, and there need be no other films or layers, if it is sufficiently chemically resistant to be exposed to air and moisture. The recording film (such as InSbSn OT GeTeSb) may be deposited by sputtering, evaporation or other means. The material composition, substrate and deposition parameters may be chosen for optimal adhesion and layer quality. Thickness may be optimized to make use of optical interference between the incident surface and the film/substrate boundary to improve coupling of the write beam (improve sensitivity) and/or enhance the reflectivity contrast in readout.

The dielectric films 744a, 744b, if present, can be formed from a number of materials, including co-deposited ZnS—SiO. A dielectric film may be added on one or both sides of the recording film 742. In the case of a top film 744a (i.e., between recording film and air) it can provide chemical and moisture protection, as well as hardness for scratch resistance. Also it can provide thermal insulation to reduce convective cooling from the recording film in a spinning disk which would otherwise reduce sensitivity. A top film can also provide an optical anti-reflection function by choosing the film's refractive index and thickness. In general, dielectric films are useful for any or all of a number of purposes, including:

controlling or compensating for differences in inter-film or inter-layer thermal properties or other thermal management purposes, such as thermal expansion coefficients, thermal capacities, thermal conductivities and the like, enhancing contrast e.g., between light reflection and absorption or scattering (Le if the dielectric is provided with a thickness such that it acts as a quarter-wave plate) and/or optical "tuning,"

reducing or preventing diffusion, transport or migration of moisture, gases or chemicals from other films or layers or from the environment, and the like, including avoiding contact of dust or aerosol particles or the like with interior films e.g., 742;

containing material that is boiled or melted in the case of erasable phase change or dye media.

In a structure with dielectric films, a metallic reflective film 746 may be added. This is particularly advantageous with dye media, since it is predominantly only the absorption of the media that is changed, and the reflection signal can be enhanced by using a reflector film and a double pass of the beam. The reflective films) 746 can be formed from a number of materials, such as aluminum or other metals. Metallic reflection films are generally good thermal conductors, and may be used in part to manage heat flow. This is particularly useful with erasable phase-change media where rapid cooling rates are desired for writing bits. Note that with first-surface recording, the substrate itself may be metallic and may act as a reflector.

The adhesion films(s) 748 may be provided between films or layers which would have poor adhesion if placed in direct contact. An adhesion film 748 between the recording film and substrate 752 provides for potentially improved adhesion to the substrate, as well as modifying the properties of the recording film when it is deposited, such as its crystallite size in the case of a phase-change medium, which can lead to improved sensitivity and recording uniformity. In addition, the adhesion film can provide optical advantages, such as modifying the readout contrast. In addition, it can be part of the thermal optimization. For example, if the media is erasable phase-change, then it is desirable to control the rate of heat flow to the substrate or other layers. The adhesion film(s) may be as thin as 2-5 angstroms.

The substrate 752 may be plastic, either transparent or absorbing, such as polycarbonate or PNIMA, or may be glass or optical crystal, metal, fiberglass or other material. A feature of first-surface reflective recording is that the optical properties of the substrate are much more relaxed. In general, any transparent or absorptive substrate may be used. The substrate may be planar (for soft-formatting) or pre-grooved, such as in DVDs. Thickness need only be sufficient to maintain mechanical tolerances such as warp.

Although the dielectric film 744a can be useful in, among other functions, reducing or avoiding, e.g., scratching or abrasion problems arising from dust or other particles, there could be a risk of data loss if the first-surface medium were not protected from contact and/or contamination (including data loss resulting from the optical or mechanical interaction of particles on or near the operational surface of the medium with the optical arm and/or read/write beam). This risk is especially great in a first-surface medium, since a first-surface medium does not provide a relatively thick protective layer such as the transparent layer 718 illustrated in the second-surface medium of FIG. 7A. In the embodiment illustrated in FIG. 1, protection from such data loss is substantially provided by the walls of the cartridge 112.

The cartridge body is preferably made by injection molding of a thermoplastic material, although other processes (such as stamping, machining, and the like) and other materials (such as aluminum, steel or other metals, resins, fiberglass, ceramics and the like) can also be used. Preferably the cartridge body is formed by joining upper half 124 (FIG. 3) to a lower half 126 along a seam line 128 such as by ultrasonic welding, adhesion, tab and slot arrangements and the like. Although the embodiment of FIG. 1 depicts finger grip ridges 132a, 132b, these may be eliminated, for example, if the drive is provided with a positive cartridge ejection mechanism (not shown).

In the depicted embodiment, the leading edge 134 of the cartridge 112 (i.e., the edge which is typically first inserted into the drive area) includes cam/centering angled faces 136a, 136b and may be provided with one or more recesses 138a, 138b, 138c, 138d, 138e, 138f which may be used, as desired, to encode, by their number, position, shape, depth or the like, characteristics of the cartridge 112 or disk 114 such as data density, number of recordable sides, formatting and the like. The recesses may be read, e.g., by one or more fingers (not shown) positioned in the drive as will be clear to those of skill in the art after understanding the present disclosure. If desired a flat and/or recessed region 143 may be provided to accommodate labels. A window 142 is formed in the upper surface 116 extending substantially therethrough and aligned with at least a portion of an upper surface of the disk 114.

Figure 9:
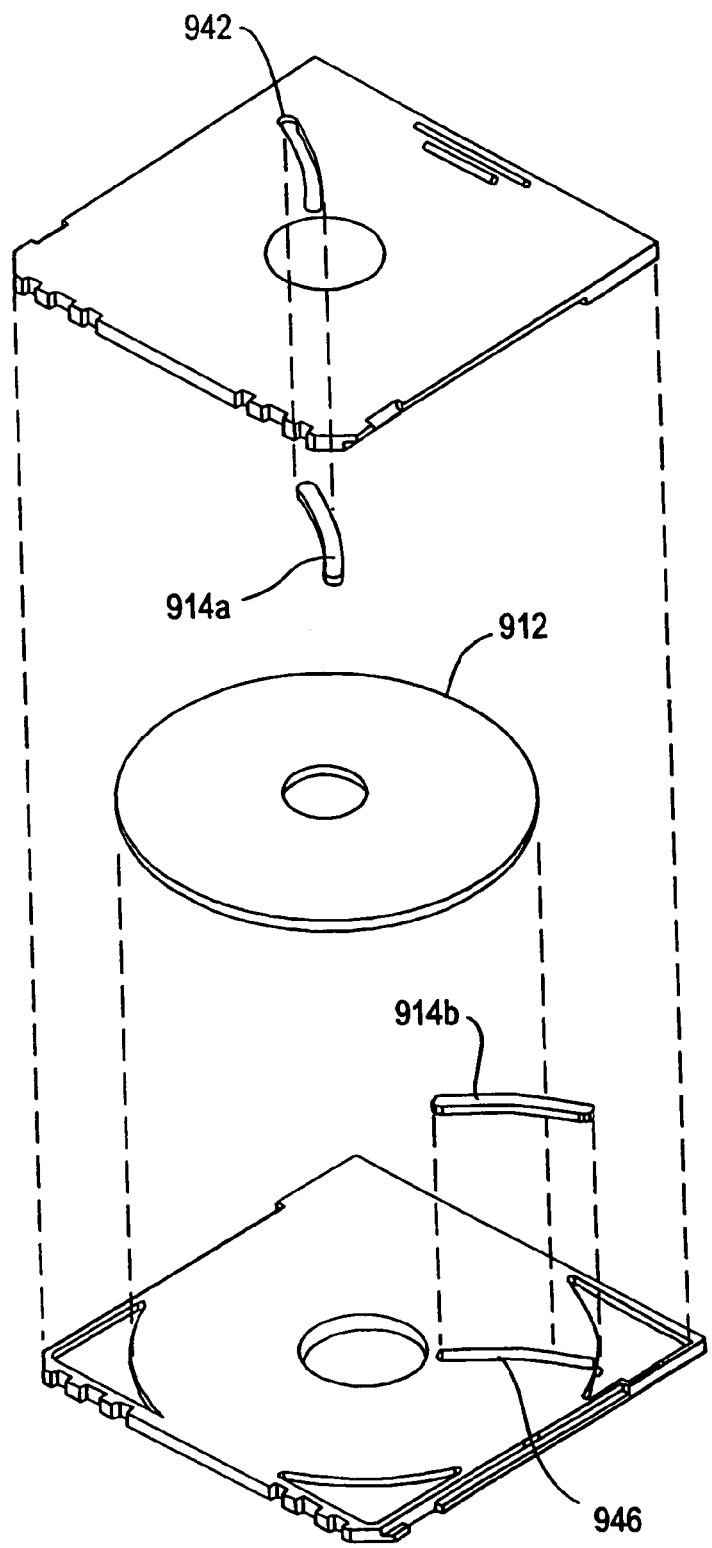
FIG. 9 is an exploded bottom perspective view of a cartridge with non-movable window covers according to an embodiment of the present invention.

In the embodiment of FIG. 9, a greater measure of protection of the recordable surfaces of the disk 912 is provided by covering the windows 942, 946 with (non-movable) covers 914a, 914b of material which is transparent (at least at the wavelength of the read/write beam). Examples of cover materials include, glass and polycarbonate.

Figure 3:
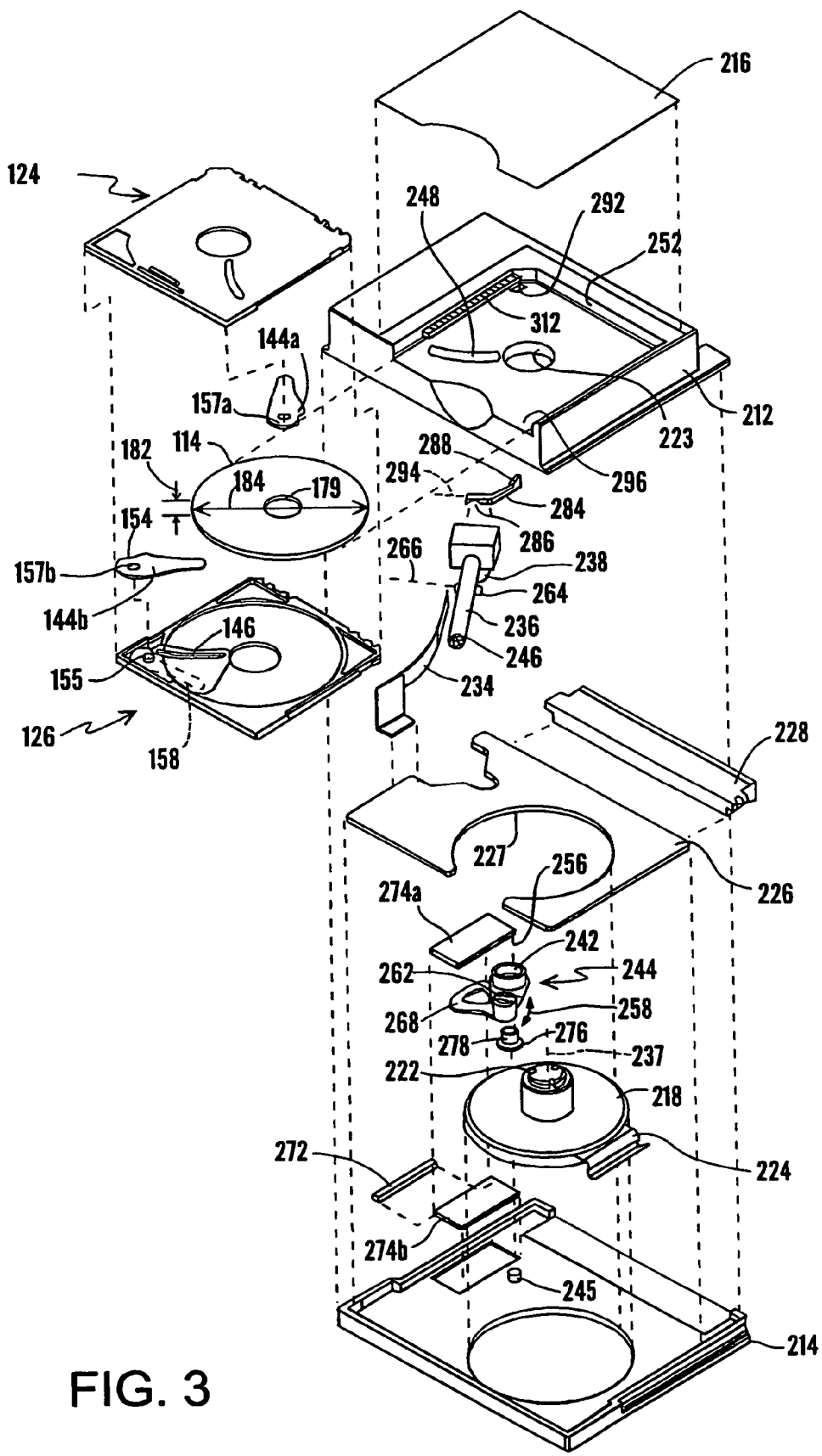
FIG. 3 is an exploded top perspective view of the device of FIG. 2, also depicting, in exploded fashion, the cartridge of FIG. 1.

In the embodiment depicted in FIG. 3, the windows 142, 146 may be closed and/or sealed by shutters 144a, 144b, pivoting about shutter pins e.g., 155, engaging shutter holes 157a, 157b. In the embodiment of FIG. 3, shutter 144a is moveable between the closed, preferably sealing, position, and an open position to permit access, through the window 142, to a recording surface of the disk 114. Preferably the cartridge 112 is configured to cooperate with the drive, e.g., as described below, such that the shutter 144a is automatically moved to the open position when the cartridge 112 is inserted in the drive and is automatically moved to the closed and/or sealing position when the cartridge 112 is removed from the drive.

Preferably, the cartridge 112 can be configured to accommodate recording on both major surfaces of the disk 114. In one embodiment, the drive is provided with an arm for recording on one surface (such as the lower surface) at a time. To record on the opposite surface, the user would remove cartridge 112, rotate the cartridge to position the opposite surface lowermost and reinsert. In such a configuration, the cartridge 112 is preferably configured with a window 146 positioned on the second surface 118. Preferably the second window 146 is located such that, following rotation to place the second surface of the recording medium lowermost as described above, the second window 146 will be located in a position (with respect to the drive) substantially identical, to the location of the first window 142 when the second surface is uppermost. In this way, the actuator arm can be in the same position range, regardless of whether surface 116 or surface 118 is uppermost.

Figure 10A:
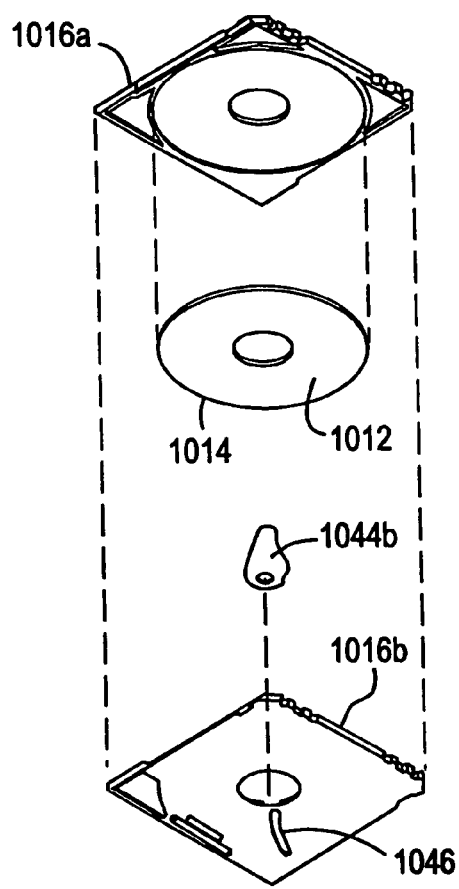
FIGS. 10A and 10B are exploded bottom and top, respectively, perspective views of a cartridge for recording a single surface of a recordable medium, according to an embodiment of the present invention.
Figure 10B:
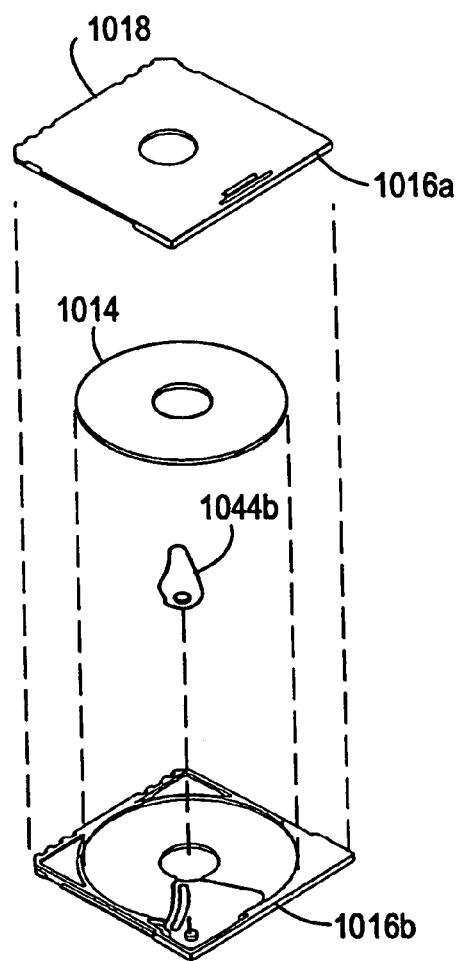

In another embodiment, as depicted in FIGS. 10A and 10B, the cartridge can be configured to provide for recording on only one surface 1012 of the disk 1014. In the embodiment of FIGS. 10A and 10B, although the cartridge contains first and second sides 1016a, 1016b, only the side which is adjacent the surface of the disk 1012 that is to be recorded, is provided with a window 1046 and shutter 1044b. Preferably, the cartridge is shaped (or has detent 1018 positions or is otherwise configured) to prevent inserting the cartridge in an attitude other than with the window 1046 accessible to the drive optics.

Figure 16:
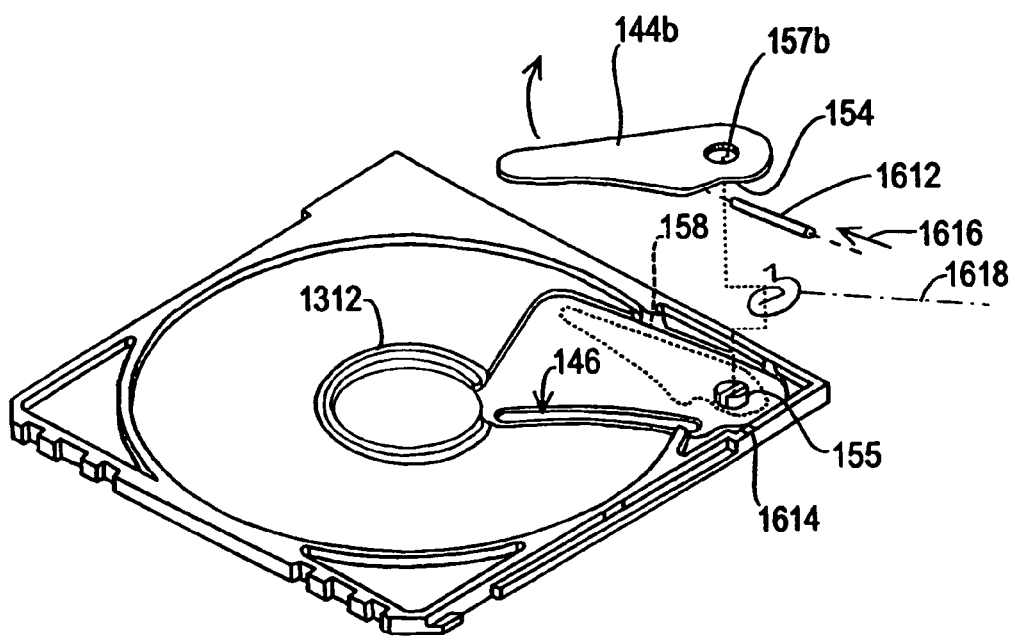
FIG. 16 is a partial perspective view of a cartridge interior illustrating a shutter-movement mechanism, according to one embodiment of the present invention.

In one embodiment, at least one, and preferably both, side edges (edges perpendicular to the leading edge 134) are provided with one or more grooves 148 for engaging one or more guide rails 312 of a drive (FIG. 3) to assist in desired alignment or positioning of the cartridge 112 with respect to the drive. In the embodiment of FIG. 16, a moveable actuating pin 1612, extending through a slot 1614 in the cartridge wall, is pushed in a direction 1616 toward the cartridge interior as the cartridge 112 is positioned in the drive. As the actuating pin 1612 moves, it engages a cam surface 154 of the shutter 144b covering the lower window 146. In this way, as the cartridge 112 is inserted into the drive, movement of the actuating pin 1612 engages the cam surface 154 so as to move the shutter 144b, against the urging of, e.g., a spring 1618, from a position covering the lower window 146 to a position 158 uncovering the window 146 (e.g., for read/write access to the disk 114). Preferably, a similar mechanism coupled to the upper shutter 144a automatically opens the upper shutter 144a when the cartridge 112 is inserted in the drive in an opposite orientation.

Figure 6:
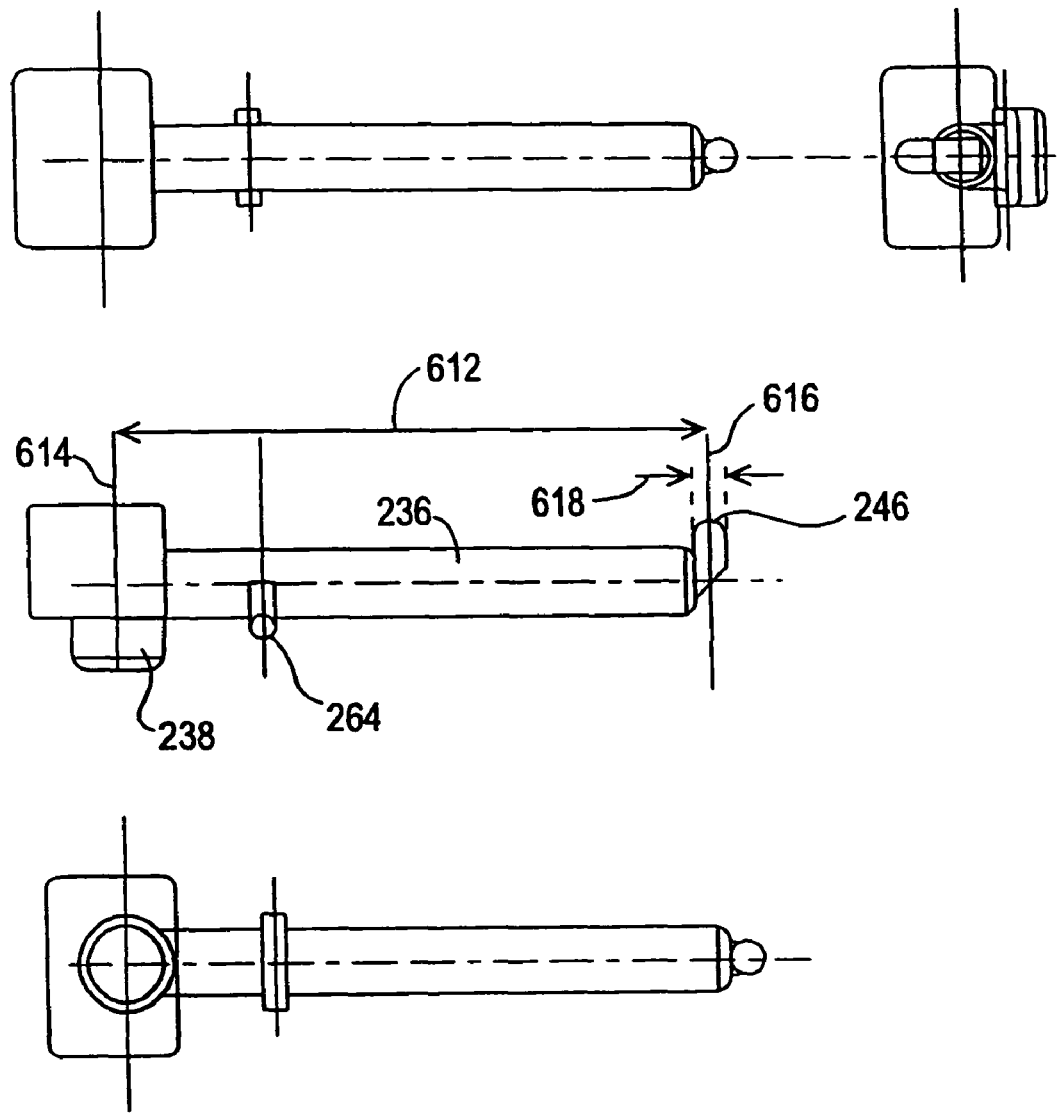
FIG. 6 is a side-elevational view of an actuator arm usable in connection with an embodiment of the present invention.

In one embodiment, the drive provides for rotary movement of an optical arm and accordingly, in the illustration of FIG. 1, the window 142 has a substantially arcuate shape defining a radius of curvature of the window midline 162 substantially equal to the effective radius 612 of the optical arm (the distance from the arm rotation axis 614 (FIG. 6) to the midline of objective end 616 of the arm). In one embodiment, the radius of curvature of the window midline 162 is about 20 mm. The window 142 has a length (measured along the midline 162) sufficient to provide access to the entire radial extent of the read/write surface of the disk 144. In one embodiment, the longitudinal extent 166 is about 9 mm. Preferably the window 142 has a transverse extent 168 sufficient to permit at least optical access of the beam and, preferably to permit protrusion of the axial extent 618 objective end of the actuator arm at least partially through the window 142. However, it is preferred that the transverse extent of the slot 168 and the size and shape of the objective end 246 of the actuator arm be selected to provide a positive stop, preventing the objective end 246 of the actuator arm from extending so far through the window 142 that the objective end 246 of the actuator arm could contact the disk 114. In one embodiment, the actuator arm may be provided with one or more flanges (not shown) to limit the amount of protrusion into or through the window 142. In one embodiment, the transverse extent 168 of the window 142 is at least about 2 mm.

In one embodiment, the cartridge 112 has a width 172 and a depth 174 of less than about 40 mm, preferably less than about 35 mm. In one embodiment, the cartridge 112 has a thickness 176 of less than about 5 mm, preferably about 3 mm. In one embodiment, the inside diameter 178 of the disk 114 is less than about 7 mm, preferably about 5 mm. In one embodiment the thickness 182 of the disk 114 is less than 1 nun, preferably about 0.6 mm. In one embodiment, the mass of the cartridge is less than about 7 gm, preferably less than about 5 gm. In one embodiment the diameter 184 of the disk is between about 30 mm and about 35 mm, preferably about 32 rum.

Figure 2:
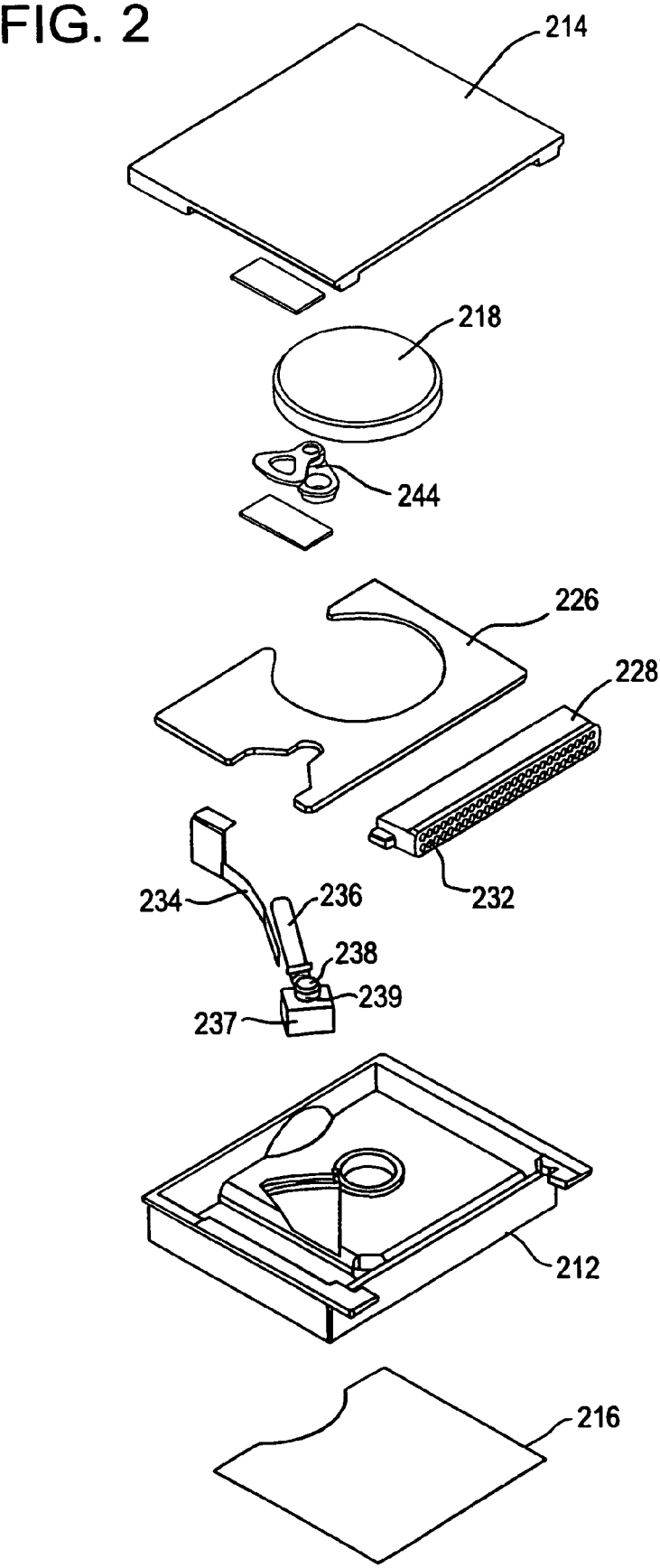
FIG. 2 is an exploded, bottom perspective view of a drive useable in connection with the cartridge of FIG. 1, according to an embodiment of the present invention.

As shown in FIGS. 2 and 3, a drive can be provided for use in connection with the cartridge 112 of FIG. 1. The drive includes a housing 212 coupled to an upper cover 216 and baseplate 214. The housing and covers can be made from a number of materials. Die-cast metal is useful for providing structural stability and matching thermal characteristics, but other materials can be used such as plastic fiberglass and the like. A spin motor 218 includes a hub 222 configured to engage the central opening 179 of the disk 114. In one embodiment, the spin motor provides a rotation rate between about 1500 RPM (e.g., for reading/writing near the outside diameter of the data area of the disk) and about 5000 RPM (e.g., for reading/writing near the inside diameter of the data area of the disk). A data transfer rate of about 1 MB per second, or more is preferably achieved. The spin motor 218 is preferably relatively efficient. In one embodiment, the drive as a whole operates on a voltage of about 3.3 Volts.

Figure 14:
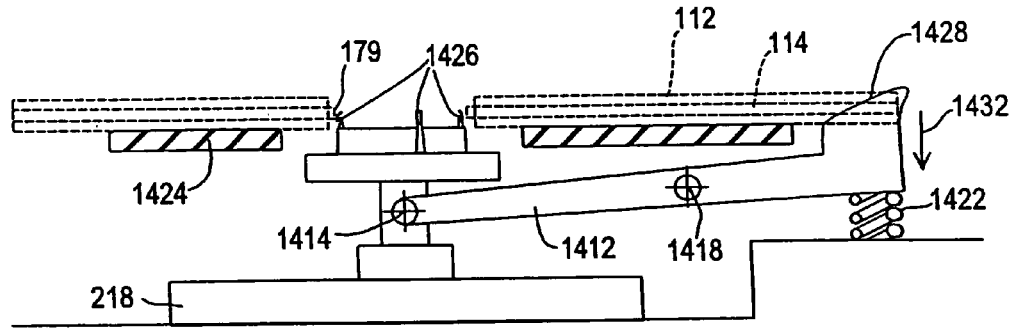
FIG. 14 is a partial cross-sectional view of a mechanism for engaging a spin motor hub.

The motor 218 can be positioned so the hub 222 extends through an opening 223 of a housing 212 which will be aligned with a central opening 179 of the disk 114 when the cartridge 112 is inserted in the cartridge receiving area 252 of the housing 212. FIG. 14 depicts one operable configuration for engaging the motor hub 222 with the central opening 179 of a disk 112. In the embodiment of FIG. 14, a spin motor 218 with a splined shaft is coupled (pivotally, about axis 1414) via trunnion 1416 to a cartridge sense arm 1412. The cartridge sense arm is mounted to permit pivoting about arm pivot axis 1418, and is urged toward the depicted retracted position by a retraction spring 1422. In use, a cartridge 112 is inserted into the drive 514, e.g., along a cartridge mounting surface 1424 until the disk opening 179 is aligned with the splined hub 222. In the depicted embodiment the hub 222 is provided with spring fingers 1426. As the cartridge 112 approaches this position, its edge engages a cam surface 1428 of the sense arm 1412 forcing the free end down (in the view of FIG. 14) 1432, against the urging of spring 1422, and causing pivoting about arm pivot axis 1418 so as to raise the hub 222 into engagement with the disk opening 179. In another embodiment, engagement can be effected by pivoting a baseplate of the drive, to which the hub (as well as, preferably, the spin motor, the optical arm and the like) is coupled, to carry the hub into engagement with the opening 179. Other manners of effecting engagement are possible such as pivoting or otherwise moving the cartridge toward the hub, providing a telescoping hub, and the like, as will be clear to those of skill in the art after understanding the present disclosure.

Referring now to FIGS. 2 and 3, the spin motor 218 is coupled by a flex circuit 224 to a printed circuit board 226. In one embodiment, the circuit board 226 has a cutout 227 to accommodate the spin motor 218, which protrudes therethrough, for reducing the overall drive thickness. The printed circuit board 226 is provided with a coupling 228, e.g., with pin or zero-insertion-force sockets 232 receiving, e.g., a flex circuit, for communicating signals to the remaining portions of the digital camera or other apparatus (not shown). Although the coupler 228 has been depicted in a generic fashion, in one embodiment, the interface (e.g., the native drive controller interface) between the drive and the camera (or other electronic device) is by a universal serial bus (USB) interface, and preferably the coupling 228 accommodates a USB connection, as well as other connections to the digital camera (or other electronic device) such a power and ground lines, and the like. In this regard a native drive controller interface is on the drive itself. Although a USB interface provides slower transfer rates than some other types of interfaces, and is generally not used as an interface for a data storage device, it supports transfer rates sufficient for, e.g., digital camera applications, and is relatively inexpensive and non-complex to implement, compared to the types of interfaces more commonly used for data storage devices (such as SCSI, PCMCIA card interfaces, and the like). In one embodiment, there is also a provision for using a USB interface to download image data from the digital camera to a PC or other computer. Preferably, the download process can involve downloading the USB driver from the camera to the computer (e.g., if the computer does not already have an appropriate driver), preferably in a fashion that is substantially transparent to the user.

Figure 11:
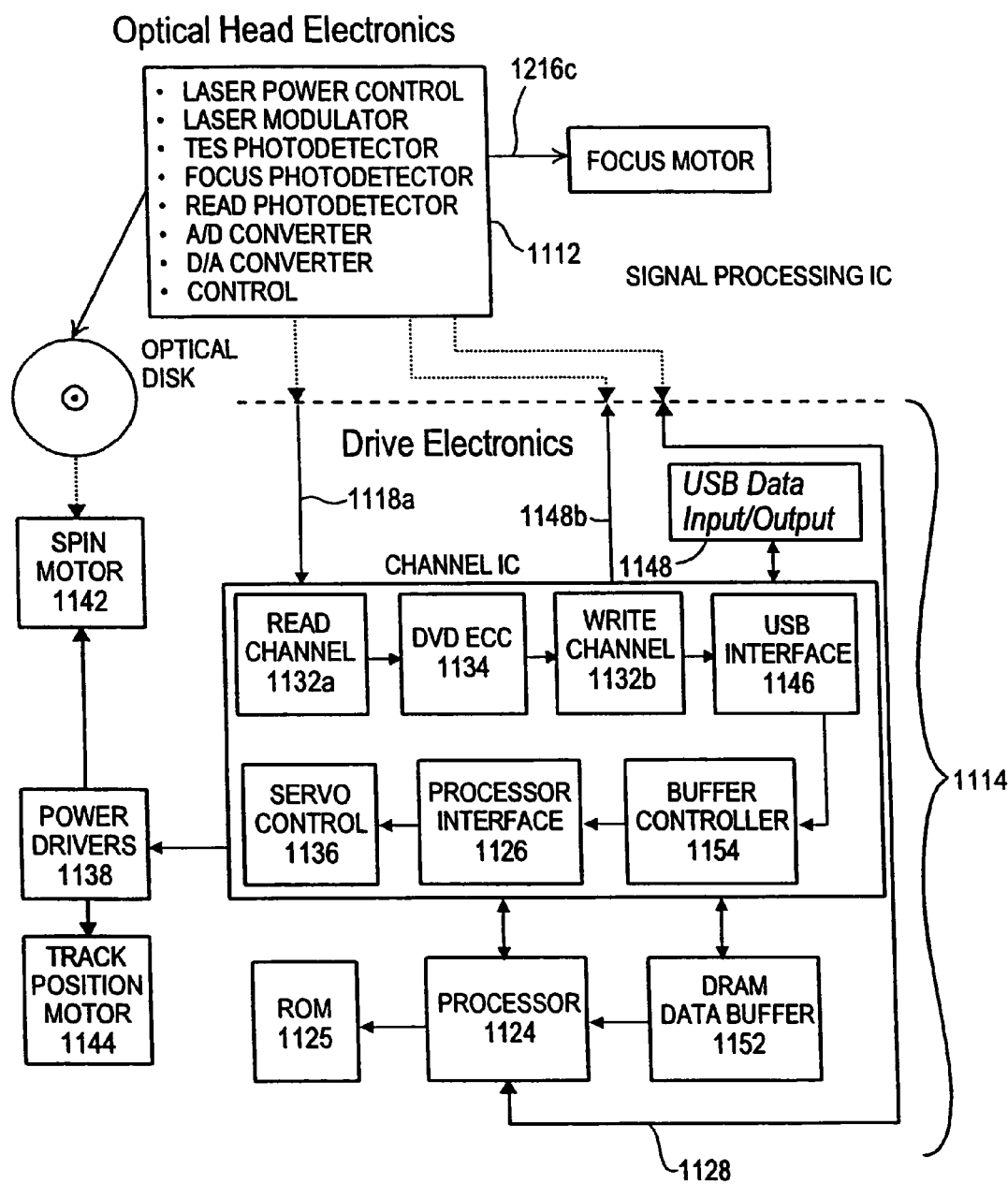
FIG. 11 is a block diagram of a main circuit board, usable in connection with the drive of the present invention.

In general, the main circuit board 226 includes control electronics, power supplies, and interface logic. The components shown in the block diagram of FIG. 11 can generally be considered as being optical head electronics 1112 or drive electronics 1114. Components of the optical head electronics 1112, such as the laser modulator, photodetectors, and analog-to-digital (A/D) and digital-to-analog (D/A) converters are preferably located relatively close to the optical arm, preferably in the electro-optic housing 237 (FIG. 2). The optical head electronics substantially involve analog signals, which are preferably converted to digital signals before transmission to other components. Signals 1118a, 1118b are communicated, e.g., via the flex circuit 234, between the optical head electronics 1112 and a Channel integrated circuit (IC) 1122. The channel IC 1122 also communicates with a microprocessor 1124, via a processor interface 1126. The microprocessor 1124 executes programs, e.g., stored in a read-only memory (ROM) 1125. Digital signals 1128 are communicated between the processor 1124 and the optical head electronics. The channel IC provides read and write channels, preferably with error correction code (ECC) circuitry 1134, such as ECC circuitry of the type used in DVDs. The channel IC 1122 provides servo control 1136 to power drivers 1138 which power the spin motor 1142 and track position motor 1144. The USB interface 1146 communicates, via a USB data input/output connector 1148 to a host USB interface (not shown), e.g., in the digital camera. The USB interface 1146 uses a dynamic random access memory (DRAM) as a data buffer 1152, via a buffer controller 1154.

Figure 12:
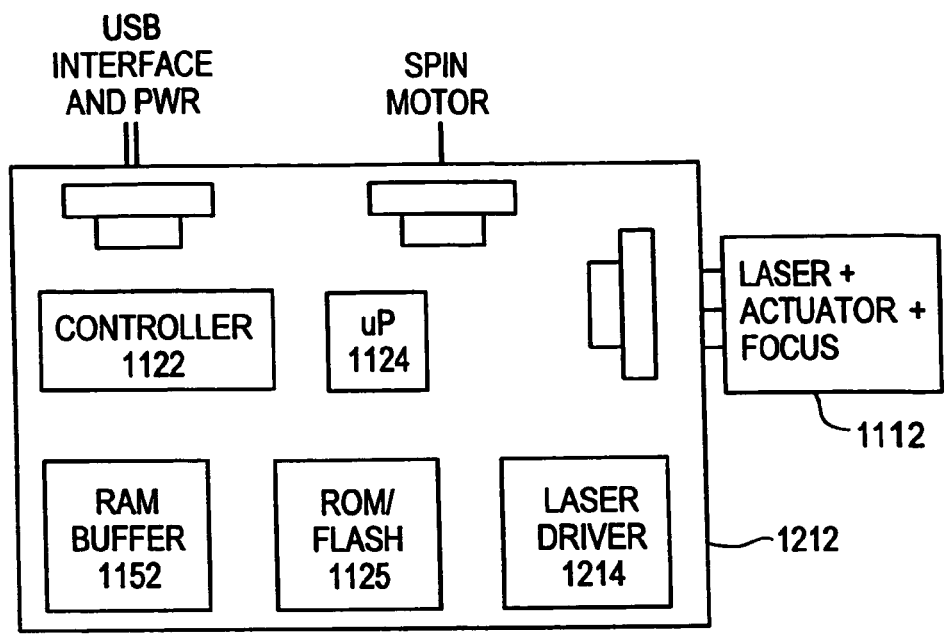
FIG. 12 is a top plan view of a layout for a circuit board of FIG. 11, according to an embodiment of the present invention.

In the embodiment of FIG. 12, the region adjacent the edge 1212 of the PCB 226 containing the connector for coupling to an optical arm 236 (specifically coupling signals for the laser, the arm actuator and the focus actuator) contains the laser driver 1214 component, assisting in maintaining a relatively short signal path for high-frequency signals. In one embodiment a flex circuit 234 is used to couple the printed circuit board 226 to the optical arm 236. The optical arm is preferably love mass, but has high stiffness, e.g., sufficient stiffness to reduce the amount of mechanical resonance which could interfere with proper tracking. In one embodiment the arm is formed from or includes titanium or steel. An electro-optic housing 237 contains sensor electronics, photo-detectors) and servo-detector(s), of configurations that will be understood by those of skill in the art after understanding the present disclosure. The optical arm 236 is configured to pivot around a pivot axis 266 through the center of pivot post 264 received in a post receiving area 242 of an actuator body 244 pivotally mounted to the baseplate 214 by post 245. The actuator body 244 is configured to provide controllable rotation of the arm 236 about a vertical axis 614 for positioning the objective end 246 of the arm 236 adjacent a desired radial position of the disk 114, for tracking. In one embodiment a typical read seek time of about 50 cosec. or less is provided.

The actuator body may also be configured to provide for controllable motion in a vertical direction 258 via pivot receptacle 262 engaging pivot 264, of the optical arm 236 for tilting the arm to provide desired spacing of the objective end 246 with respect to a surface of the disk 114, e.g., for focus control. Preferably focus is provided while maintaining the laser source and the objective end 246 in a fixed spatial relationship with respect to one another. For example, when focus is effected by tilting the arm 236, the laser source remains in the same, fixed spatial relationship, and remains the same distance (e.g., measured along the optical path from the laser source) with respect to the objective during tilt movements (although both the laser source and the objective will move with respect to the surface of the disk 114, during tilt movements). Rotation about the vertical axis 256 can be provided by controlling current through a coil 268, such as a bonded wire coil (e.g., for reducing mass). The coil 268 is positioned between parallel, spaced-apart return plates 274a, 274b whose edges are coupled (e.g., by an adhesive) to a permanent magnet such as a rare earth magnet, 272. Vertical motion 258 is provided by controlling current to a coil 238 concentric with a center pole holder 278 mounted concentrically with the hub or post receptacle 242 and positioned on disk-shaped permanent magnet 276.

When, as in the depicted embodiment, tracking is performed by rotating the arm 236 about a vertical axis (i.e., an axis parallel to, but spaced from, the axis of rotation 237 of the disk 114) an embodiment of the present invention provides for facilitating tracking by reducing the rotational moment of the optical arm 236 to a relatively low value, such as less than about 5 gm-cm2, preferably less than about 1 gm-cm'. Features that contribute to ease of tracking include reducing the number and/or mass of components which are coupled to (and move with) the arm, and positioning components relatively close to the arm rotational axis 614, and preferably such that the center of mass of the optical arm assembly is at or close to the rotation axis 614.

Preferably, a detent/latch 284 includes a cut-out 286 for engaging a portion of the arm 236 and holding it in a parked position, e.g., when the cartridge 112 is withdrawn from the cartridge receptacle area 252. A cam surface 288, e.g., protruding through an opening 292 is moved, in response to insertion of a cartridge 112 in the receiving area 252, to pivot the latch 284, e.g., about latch axis 294 to a position disengaged from the arm 236.

Figure 15A:
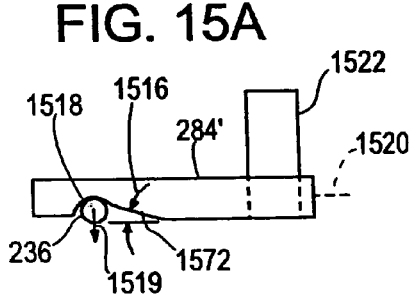
FIGS. 15A and 15B are side elevational views of an optical arm latch in first and second positions, according to an embodiment of the present invention.
Figure 15C:
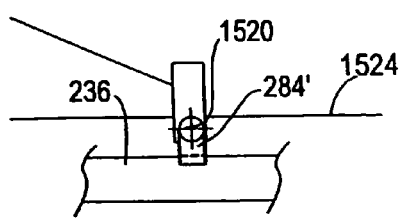
FIGS. 15C and 15D are end elevational views of an optical arm latch in positions corresponding to those depicted in FIGS. 15A and 15B, respectively, according to an embodiment of the present invention.
Figure 15B:
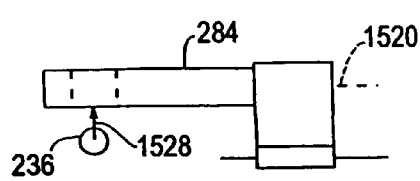
Figure 15D:
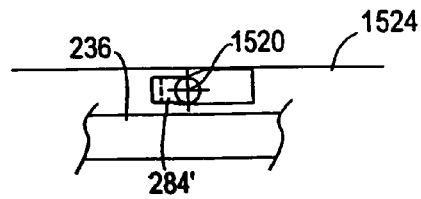

FIGS. 15a, 15b, 15c, and 15d illustrate operation of an arm latch 284' according to an embodiment of the present invention. In the embodiment of FIGS. 15a, 15b, 15c, and 15d, the latch 284' has a lower surface which includes a ramp 1512 defining a ramp angle 1516 leading to a detent 1518 configured to engage the upper surface of the optical arm 236. Preferably, the detent is positioned and shaped so that when the arm is engaged (as depicted in FIGS. 15A and 15C), it is both retained (against vertical and lateral movement) and retracted 1519 (so as to move the optical end of the arm away from the cartridge or disk area. The latch is mounted to permit pivotal movement about a latch pivot axis 1520. The distal end of the latch 284' includes a sensing cam 1522. When a cartridge is inserted in the drive 514, e.g., along cartridge plane 1524, the edge of the cartridge engages the sensing cam 1522, causing the latching arm to pivot about the latch pivot axis 1520 from the engaged configuration shown in FIGS. 15A and 15C to the disengaged configuration shown in FIGS. 15B and 15D. In the disengaged configuration, there is sufficient clearance, with respect to the latch, that the optical arm is free to move 1528 away from the retracted position and is flee to move laterally (for tracking) and, in at least some configurations, vertically (e.g., for focus). When the cartridge is withdrawn from the drive 514 the latching arm is urged (e.g., by a spring, not shown) toward the engagement position shown in FIGS. 15A and 15C, and the optical arm 236 is guided toward the detent 1518, e.g., by the ramp 1512.

In one embodiment, in assembling the device depicted in FIG. 3 the motor 218 is axed to the baseplate 214. The board 226 is placed with the motor 218 protruding through the cutout 227, the flex circuit 224 of the motor 218 attached to a connector on the main board 226. The arm actuator and the optical arm are then assembled, and the flex circuit 224 is then coupled to a connector on the main circuit board 226.

In use, the cartridge 112 is inserted through a slot opening so that the rails 312 engage the grooves 148 pushing the slide 152 back to position the shutter 144b in the open position 158 and to rotate the latch 284 to disengage the arm 236. The disk 114 is rotated by hub 222 of the spin motor 21 8. In response to signals received through the connector 228, current is provided to coil 268 to rotate the arm 236 about the vertical axis 256 for tracking and to pivot the arm for focus. Upon withdrawal of the cartridge 112 from the receiving area 252, the shutter 158 is automatically closed so as to cover the window 146 and the arm 236 is automatically latched.

Figure 5:
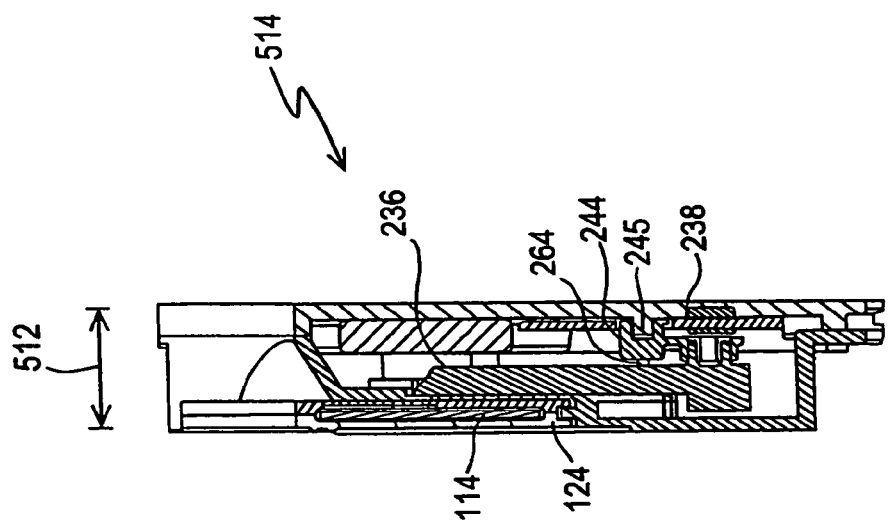
FIG. 5 is a cross-sectional view taken along line 5-5 of FIG. 4.
Figure 4:
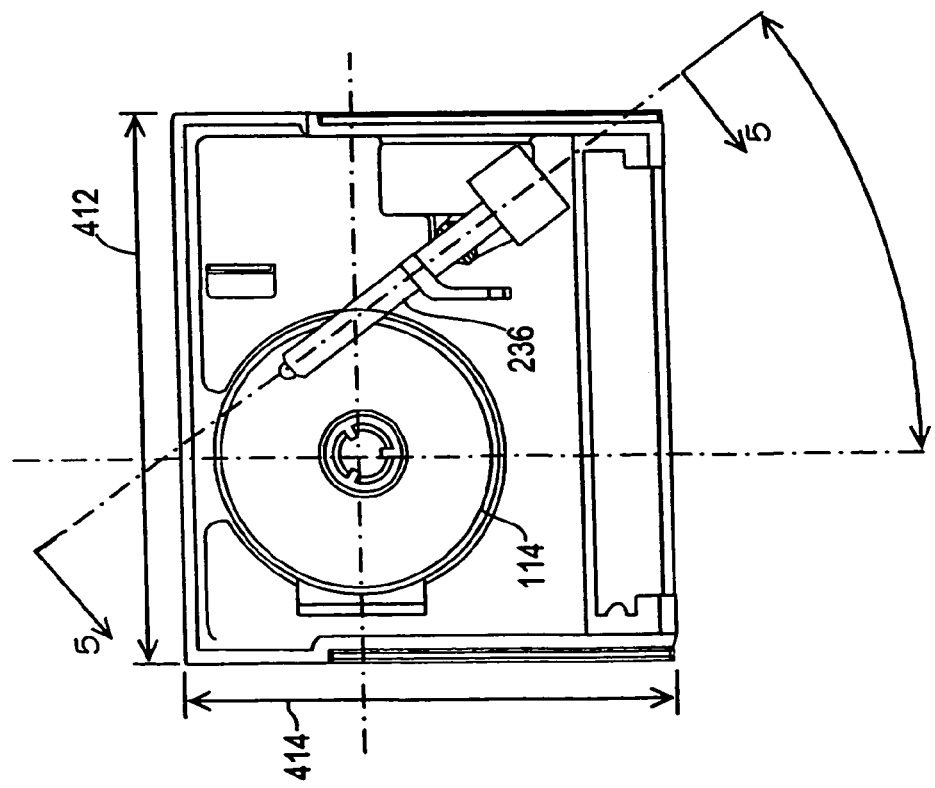
FIG. 4 is a top plan view of a drive and inserted cassette, with a top cover removed, according to an embodiment of the present invention.

In one embodiment, the drive depicted in FIGS. 4 and 5 has a width 412 of about 52 mm, a height 512 of about 10.5 mm and a depth 414 of about 40 mm. The disk 114 preferably has a capacity of about 0.250 Gbyte for each surface of the disk using a 635 nm wavelength laser (with greater capacity being provided with a shorter-wavelength laser). In one embodiment, data is recorded using a minimum spot size of 0.4 micrometers, a track pitch of 0.74 micrometers, and achieves a data rate of about 1 Mbyte per second. In one embodiment, the data outside diameter is about 29 mm, the data inside diameter is about I 1 mm providing a data area per side of about 0.877 square inches (about 565 square mm). The disk rotation speed is preferably about 73 revolutions per second. A number of encoding schemes can be used, including, for example, 8/16 run-length limited (RLL), with Reed-Solomon error correction code (ECC).

Figure 17:
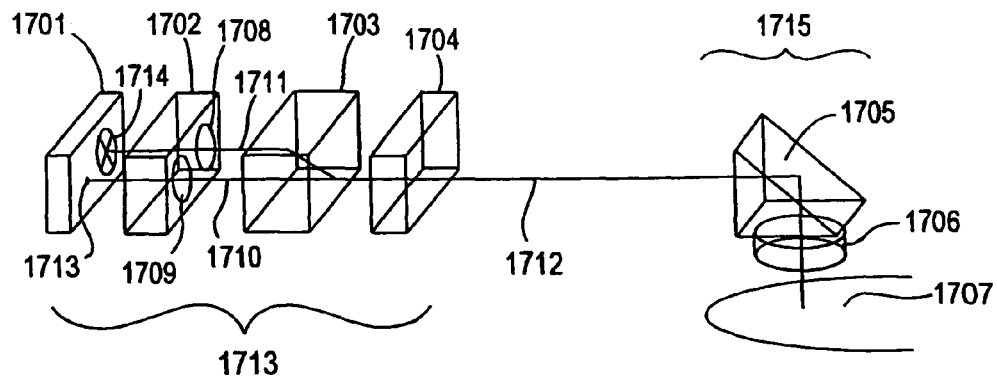
FIGS. 17 and 18 are schematic, perspective, partially exploded, and top plan views, respectively, of optical components according to an embodiment of the present invention.
Figure 18:
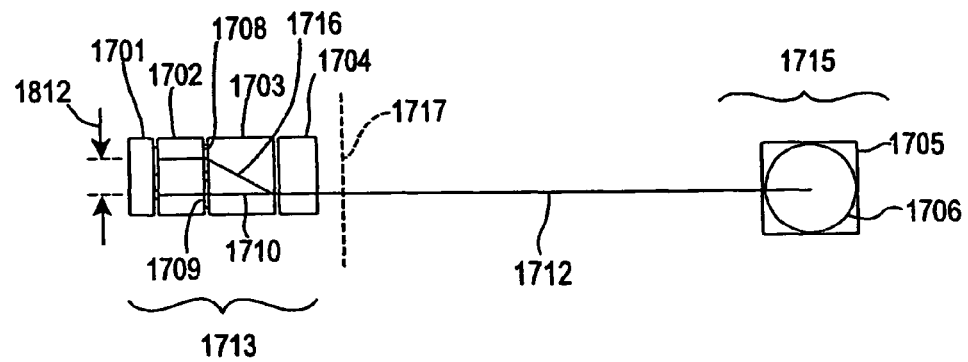

As depicted in FIG. 17, in one embodiment an optical configuration according to the present invention includes a laser/detector and optics assembly 1713, preferably positioned in the electro-optics module 237, and objective optics 1715, positioned at the objective end of the optics arm 236. In one embodiment, the laser source is provided on a semiconductor chip 1701, such as a GaAs chip. In a preferred embodiment, the laser source is a vertical cavity surface emitting laser (VCSEL) 1720. Examples of VCSELs are described in U.S. Pat. Nos. 5,757,741 and 5,831,960. Preferably, a photodetector array 1714, such as a quadrant photodetector array or a φ photodetector array, is formed integrally with the laser, on the chip 1701, i.e., in an integrated device. The VCSEL and photodetector(s) are formed on the same substrate, typically a GaAs substrate. In one embodiment, the detector is a metal-semiconductor-metal (MSM) type. Integration provides a number of benefits. In general, integration of multiple components is relatively economical. Integration makes it possible to precisely determine the relative positions of the laser 1720 and detector 1714, both axially (e.g., to position in a common plane) and laterally (e.g., to provide a desired spacing 1812 (FIG. 18), such as about 0.05 mm). This can be useful in reducing or eliminating the need for positional adjustments of components during assembly or maintenance of drives. Some or all of these benefits may also be provided by using a hybrid device, in which the laser and photodetector(s) are formed separately, then mounted on a common substrate. During data writing, a relatively high power, preferably vertically, linearly polarized beam 1710 is emitted from the laser. This is generally a divergent beam which (if necessary) may be collimated (or have its divergence reduced) by a lens 1709. In the depicted embodiment, lens 1709 is provided on optic part 1702. Optic part 1702 may be glass or plastic and may contain conventional (e.g., refractive) or diffractive components. Optic part 1702 can be made in a number of ways such as by molding etching or machining. The beam 1710 then passes through a birefringent component 1703. In the depicted embodiment, the outgoing beam is undeviated when linearly vertically polarized. The birefringent component 1703 can be any birefringent material, such as calcite, suitably transparent for the application (e.g., at the wavelengths) of the light beam 1710). The beam is converted to circular polarization by an optical quarter wave retarder 1704. The beam 1710 then traverses the main length of the optical arm 236, before reaching turning prism (or mirror) 1705, which may be, e.g., glass or plastic. To assist in reducing the rotational moment of the optical arm assembly, the prism 1705 (and lens 1706) are preferably as small as possible. An additional advantage of making the prism 1705 and lens 1706 small, is that smaller components are more readily made of (relatively less dense) acrylic or plastic. The beam 1710 is focused to a tight spot by the (diffractive or refractive) objective lens 1706 onto the recording layer of the disk 1707. Preferably, the lens 1706 is positioned relatively close to the prism 1705, to facilitate providing a drive 514 with a small thickness 512. In one embodiment, the prism 1705 and lens 1706 are integrally formed (made as or from a single piece).

During writing (at high power) and reading (when the laser power is reduced so as to ensure that no writing occurs), the beam is reflected back from the disk 1707 with substantially a reversed direction of rotation of polarization. The power of the reflected beam will vary depending on whether or not the area of the recording layer on which the beam is focused, contains a previously-written spot. The reflected beam retraces its path through the objective lens 1706, prism 1705 and along substantially the same path 1712, Upon reaching the retarder 1704, the beam is converted to a horizontal linear polarization. When it encounters the birefringent component 1703, the beam shears in a horizontal direction, 1716, exiting the birefringent component as beam 1711, parallel to the original beam 1710, but displaced by a small amount 1812, such as about 100 to 200 micrometers. When the reflected beam enters the optic component 1702, it encounters an astigmatic element 1708, such as a cylindrical lens, before being projected onto the detector array 1714. If the astigmatic element 1708 is a cylindrical lens, then the detector array 1714 should be a conventional quadrant configuration.

The signals derived from the detector array, in various combinations, can be used to form the focus and tracking signals (or focus and tracking error signals) required for the focus (e.g., by pivoting about a focus pivot axis 1717, as described below) and tracking servo systems 1216c, 1136, as well as the recovered stored digital data, in a manner that will be understood to those of skill in the art after understanding the present disclosure.

Figure 19:
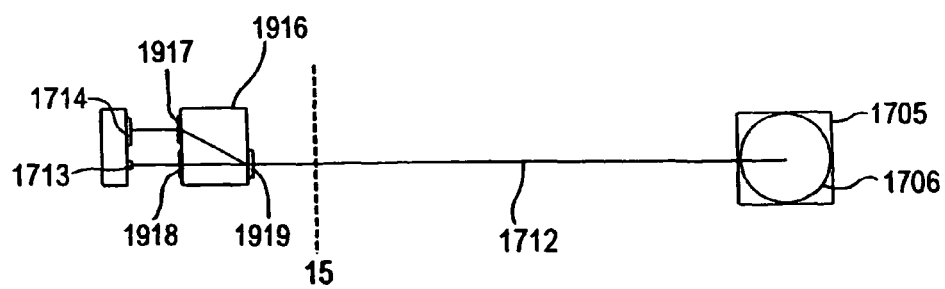
FIG. 19 is a top plan view of optical components according to an embodiment of the present invention.

In the embodiment of FIGS. 16 and 17, polarization control is used to provide both efficient read and write paths (potentially approaching 100% efficient), and good isolation of the laser 1720 from reflected light 1711 (which can otherwise make laser output unstable and lead to noisy signals). Other embodiments are possible. For example, the laser and detector array can be provided as separate devices, e.g., on separate substrates (non-integrated), and in this configuration it may be economically or otherwise desirable to use an edge-emitting laser. A polarizing beam splitter, polarizing cube, or Wollaston prism or the like may be used to direct the returning beam 1711 to a separate detector array. It is also possible to provide a system which does not use polarization methods, as depicted in FIG. 19. In the embodiment of FIG. 19, unpolarized outgoing beam 1920 is collimated (or its divergence is reduced) by lens 1918 on the surface of multi-optic 1916. The beam passes through grating 1919 which deflects a small portion out of the main beam into some angle (not shown). This deflected portion is discarded from the outgoing beam. Upon return from the disk, grating 1919 deflects a portion towards a combined grating/lens element 1917, which directs the returning light 1721 to detector array 1714. The grating/lens element 1917 may, as in the embodiment of FIGS. 17 and 18, have an astigmatic function (in which case detector array 1714 is a quadrant configuration). The system of FIG. 19 does not require any specific polarization of the laser.

Figure 24A:
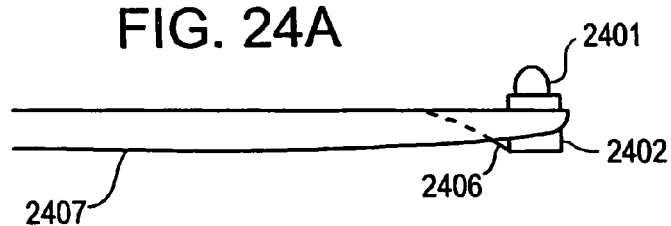
FIGS. 24A and B are partial side elevational and perspective views of an optical arm according to an embodiment of the present invention.
Figure 24B:
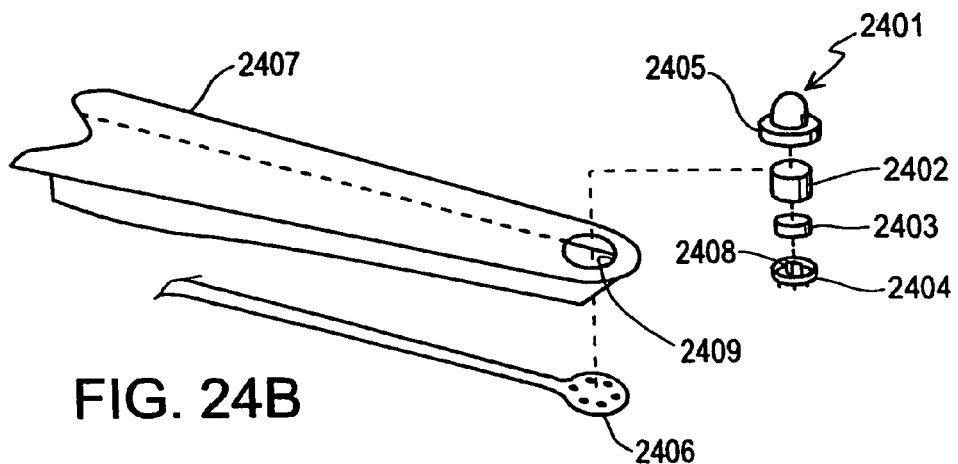
Figure 25A:
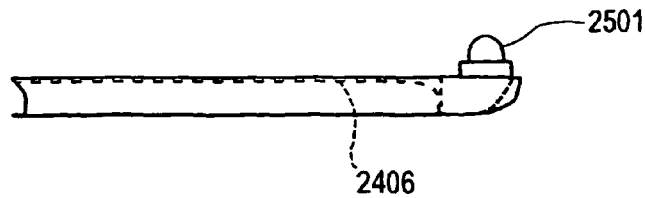
FIGS. 25A and B are partial side elevational and perspective views of an optical arm according to an embodiment of the present invention.
Figure 25B:
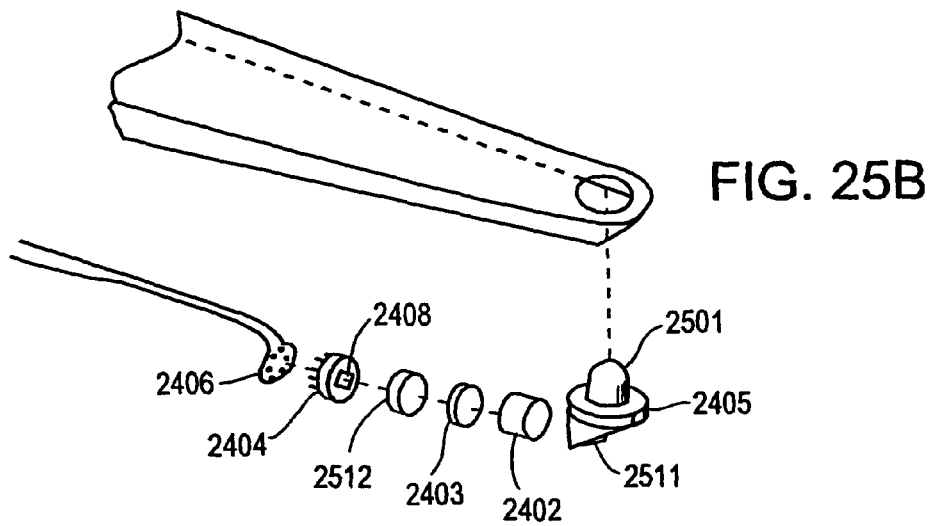

FIGS. 24A and 24B and 25A and 25B illustrate other configurations of optical arms, and placement of optics components, according to embodiments of the present invention. In the embodiment of FIGS. 24A and 24B, substantially all the optical components are positioned on-axis, near the objective end of the arm 2407. In the depicted embodiment, the arm 2407 has a flanged or inverted-U shape or inverted channel shape. Positioning all the components together assists in avoiding optical alignment problems that may occur as a result of movement or vibration (e.g., mechanical resonance) in the arm. In the depicted embodiment, the objective 2401, a spacer 2402, refractive/diffractive element(s) 2403 and laser/photodetector unit 2404 (bearing a preferably integrated laser and photodetector chip 2408) are mounted in-line e.g., through an opening 2409 at the objective end of the arm 2407. In the depicted embodiment, the objective 2401 is provided with a mounting/stop flange 2405, e.g., for limiting penetration of the objective through a cartridge window or other opening. Pins 2410 or other connectors of the laser/photodetector unit 2404 are coupled, e.g., via a flex circuit 2406, to signal processing, power and/or drive circuitry. The embodiment of FIGS. 25A and 25B is similar to that of FIGS. 24A and 24B (i.e., provides for substantially all optical components at or near the objective end of the arm 2407), except that the objective 2501 includes (or is coupled to) a tuning prism 2511, and not all optical components are on-axis. FIG. 25B also includes an illustration of a beam splitter 2512.

Figure 20A:
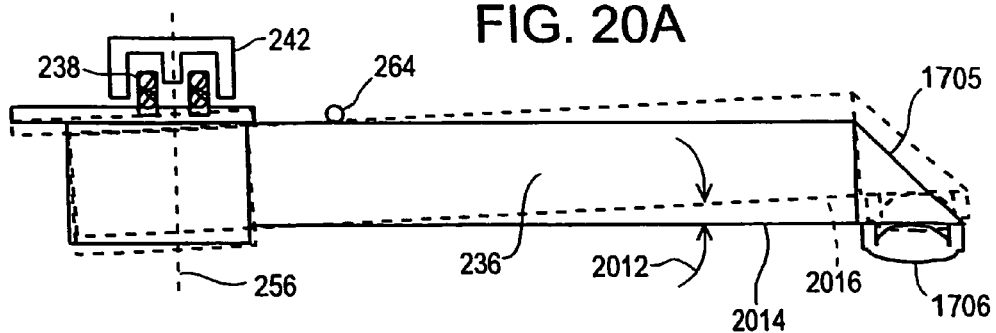
FIGS. 20A and 20B are side elevational and end elevational views of an optical arm according to an embodiment of the present invention.
Figure 20B:
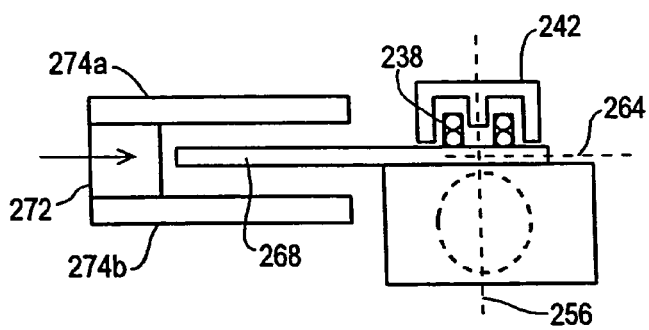

FIGS. 20A and 20B illustrate one embodiment of a focus and tracking servo. FIG. 20A illustrates a method and apparatus involving tilting of the optical arm. In this embodiment, the arm 236 pivots about pivot pin 264 such that the objective lens 1706 is positioned appropriately above the moving disk. A current in coil 238 generates a magnetic field which repels or attracts permanent magnet 242 which is mounted in a fixed position with respect to the baseplate 214 of the assembly. By controlling the amount of current in coil 238, the degree of tilt may be controllably selected, e.g., to provide any desired tilt angle 2012 (positive or negative) between a first attitude 2014 and a second attitude 2016, so as to control the distance from the objective lens 1706 to the recording layer, and thus control the focus.

FIG. 20B is an end view depicting the optical arm rotary tracking servo (in a view directed toward the objective end of the arm). Coil 268 is positioned between two plates 274a, 274b which guide and concentrate the magnetic field from permanent magnet 272 such that a current in coil 268 produces a torque about tracking axis 256.

Figure 21A:
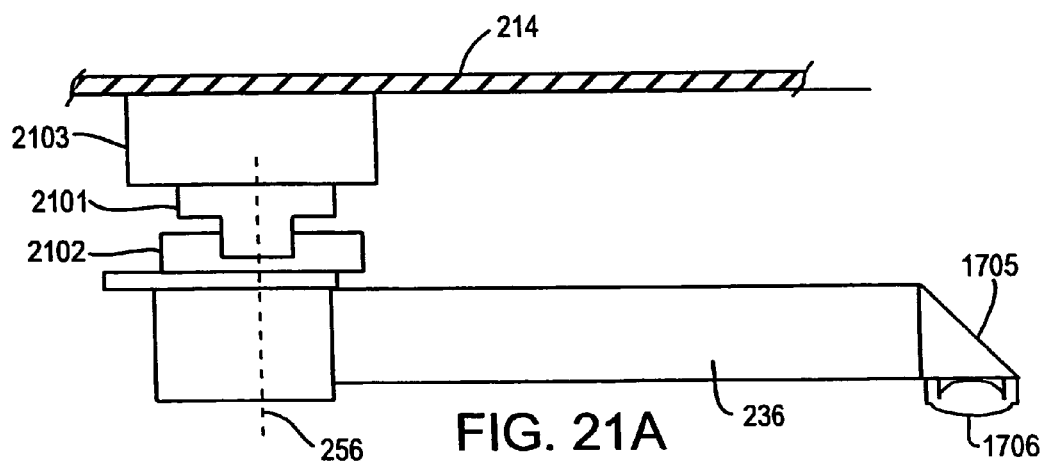
FIGS. 21A and 21B are side elevational views of optical arms and focus actuators, according to embodiments of the present invention.

Other embodiments for a focus servo mechanism are illustrated in FIGS. 21A and 21B, 23 and 27. In FIG. 21A, a ball bearing 2102 facilitates rotation about tracking axis 256. Coupling piece 2101 is bonded to piezo-electric transducer 2103, which is in turn mounted in a fixed position with respect to the assembly baseplate 214. Focus position is adjusted by applying voltage to transducer 2103, causing it to expand and contract, thus changing the position of arm 236 relative to the baseplate (and the hub and disk, in turn).

Figure 23:
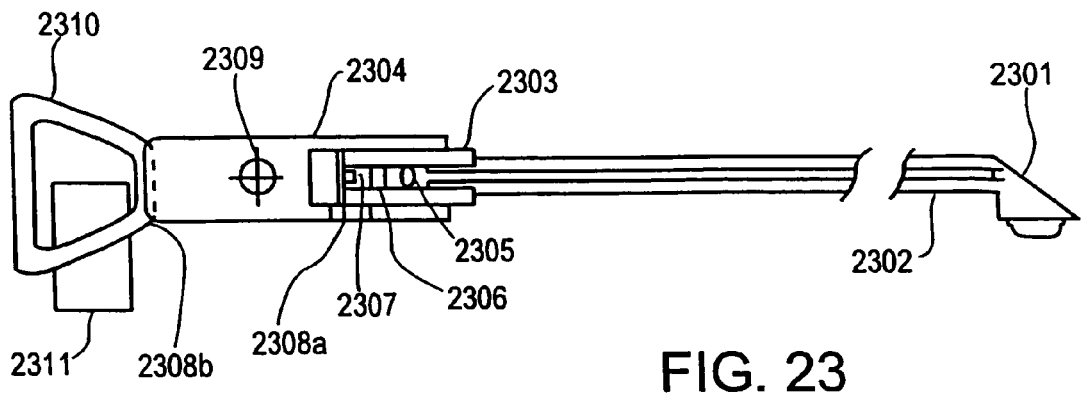
FIG. 23 is a side elevational view of an optical arm and focus actuator according to an embodiment of the present invention.

In FIG. 23, the optical arm 2302 is held in a tilt pivot bearing housing 2304 pivotally mounted for pivoting about tilt bearing axis 2309. An optic housing 2303 holds optics such as a (preferably integrated) laser/photodetector assembly 2307 (communicating with signal processing/power circuits via a flex circuit 2308a), a beam splitter 2306 and refractive/diffractive element(s) 2305. The objective end of the arm holds an objective/turning prism assembly 2301. Focus voice coil 2310, which receives focus drive signals, e.g., via a flex circuit 2308b, is positioned between two plates (only one of which, 2311, is shown) which guide and concentrate a magnetic field (e.g., from a permanent magnet, not shown) such that a current in coil 2310 produces a torque about the focus axis 2309.

Figure 27:
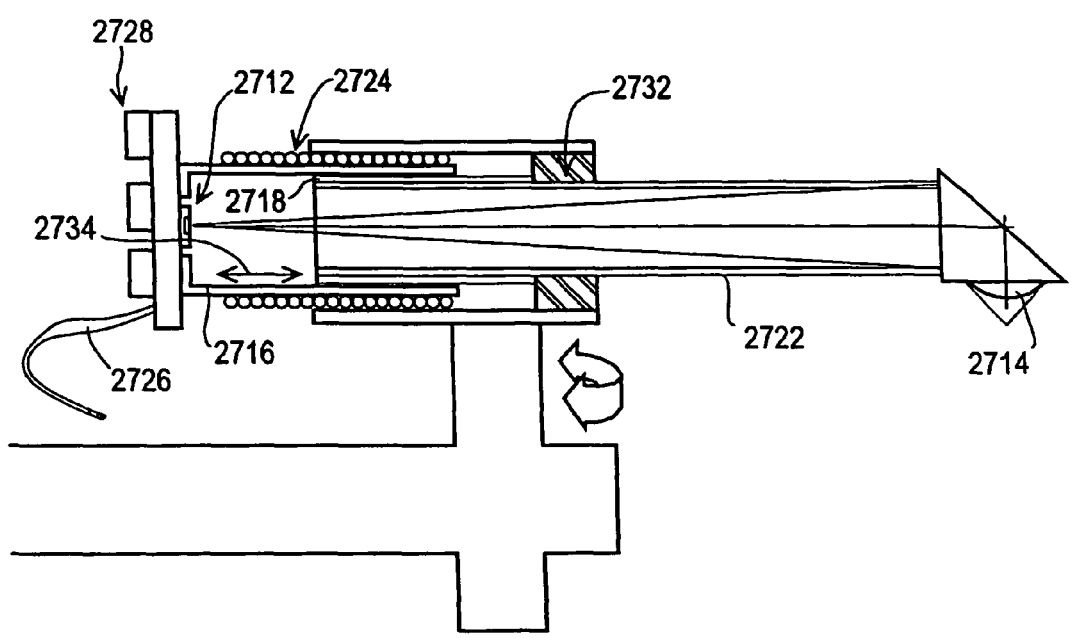
FIG. 27 is a schematic, side elevational view, partly in cross-section, depicting an optical arm with a linear focus system according to an embodiment of the present invention.

In the embodiment of FIG. 27, focus is achieved by adjusting the length of the optical path from the laser 2712 to the objective 2714. In the depicted embodiment, the laser 2712 is mounted on a sleeve 2716 which is sized and shaped to slidably fit over the near end 2718 of the optical arm 2722. When a coil 2724 on the sleeve 2716 is provided with controllable current (e.g., via flex circuit 2726 coupled to power or control circuitry, not shown, and/or demodulator and other electronics 2728, shown coupled to the sleeve 2716, in the depicted embodiment), an attractive/repulsive force developed by interaction with an annular permanent magnet 2732 causes the sleeve to controllably move fore or aft in an axial direction 2734, affecting focus.

Figure 21B:
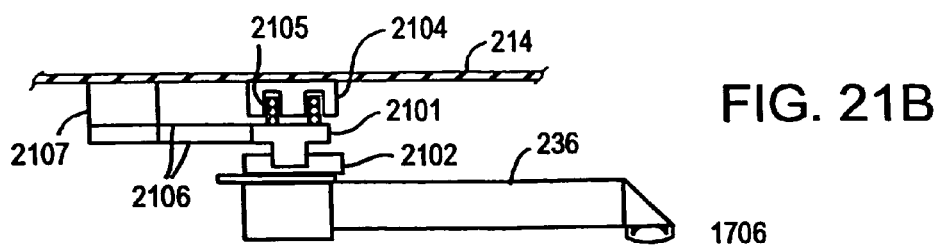

In the embodiment of FIG. 21B, ball bearing 2102 provides rotation capability. Coupling piece 2101 is held by flexure plates 2106, attached to rigid block 2107, which is attached to the baseplate 214. A current in coil 2105, attached to the coupling piece 2101, creates a magnetic field which attracts or repels that of the permanent magnet 2104 (via an air gap). The force causes plates 2106 to bend in an "S" shape, and therefore alter the height of the arm 236 above the disk. The material and dimensions of the plates 2106 are important, since they must have a suitable restitution spring force to provide sufficient servo bandwidth, but should be designed to minimize track position crosstalk. For example, sideways flexibility, e.g., due to narrow plates, would appear as tracking error and/or as focus/tracking crosstalk.

Figure 22:
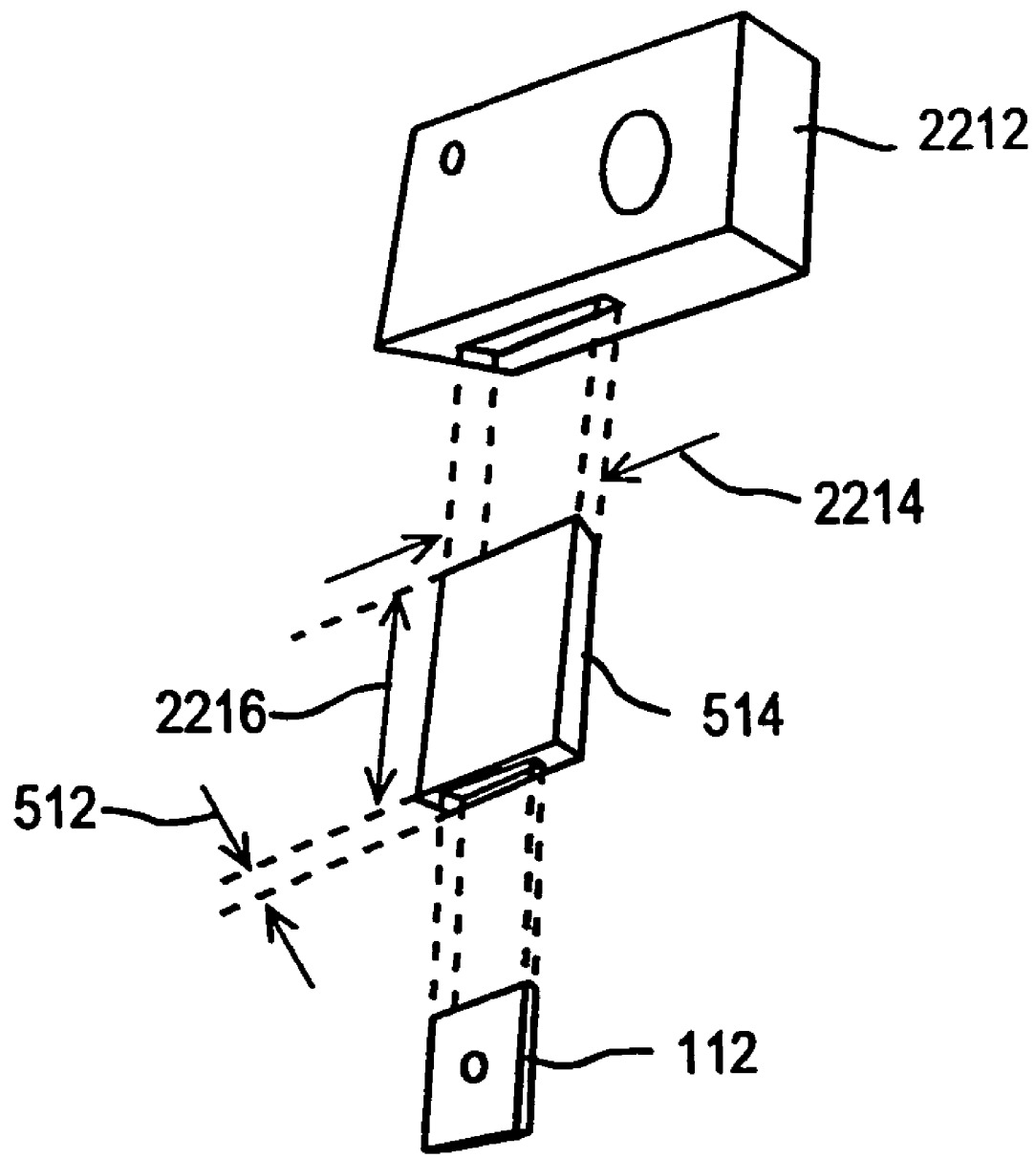
FIG. 22 is a bottom perspective, partially exploded, view of a digital camera, according to an embodiment of the present invention.

In light of the above description, a number of advantages of the present invention can be seen. The present invention provides sufficient capacity to store approximately 0.5 Gbytes or more of data (corresponding to approximately 100-200 full color, high-resolution images) on two surfaces of an optical disk cartridge 112 about 35 mm square and about 3 mm thick, so as to be readily accommodated in a digital camera 2212 (FIG. 22) having a size, shape and weight not substantially exceeding size, shape and weight of corresponding film cameras (such as typical 35 mm film cameras), preferably being substantially a pocket-sized device, as discussed above. The present invention provides drive 514 for an optical recording medium having a thickness 512, width 2214 depth 2216 and weight so as to be readily accommodated in a digital camera 2212 having a size, shape and weight not substantially exceeding size, shape and weight of corresponding film cameras. In one embodiment, the thickness 521 and width 2214 of the drive are substantially equal to or compatible with a Type III PCMCIA opening, such as being about 10 mm or less in thickness 521 and about 52 mm or less in width 2214. In one embodiment the depth 2216 of the drive is about 40 mm or less. In one embodiment, the mass of the drive is less than about 50 gm, preferably less than about 35 gm. The present invention provides an optical data storage cartridge which can be used in connection with a first-surface writeable optical storage medium. Preferably the medium is formed as a first-surface medium, i.e., in which the writeable medium is either uncoated or provided with a coating sufficiently thin that there is substantially no optical effect of the coating. Because of the relatively unprotected nature of the first-surface medium, it is particularly useful to protect the preferably removable disk by encapsulation or envelopment in a cartridge, preferably one which can be sealed, e.g., via shutters and/or a hub seal 117 to protect from dust, particulates, contact and the like. Preferably, the medium is substantially conductive which is believed to assist in avoiding static or other charge accumulation which can undesirably attract dust or other contaminants.

As noted above, first-surface recording does not have the scratch/contamination advantage of conventional optical disks, so the media are advantageously protected by housing in an enclosed cartridge. This is not a significant disadvantage in the case of small, approximately 30 mm diameter, disks intended for portable consumer devices, since it would be advantageous to protect optical disks of this size by a cartridge regardless of the presence or absence of a protective layer, due to the heavy direct handling they would otherwise receive on their optical surfaces. However, the optical solution is still preferred over the magnetic because to achieve high density, magnetic storage requires very low flying heights (such as about 0.025 to 0.05 µm) which is substantially incompatible with a removable cartridge since it is believed dust cannot economically be excluded at this level, even within a cartridge.

A first-surface media requires only a single substrate, that may be typically injection-molded polycarbonate or acrylic, onto which the recording layer or stack is deposited. Other substrate material can be used such as aluminum or other metals, fiberglass and the like. A double sided version of the disk simply has a recording layer deposited on both surfaces. This is in contrast to DVD-R where the use of 2 sides requires 2 substrates, with their appropriate stacks, to be bonded together. Particularly in the case of WORM media, first-surface storage can be maximally simple, perhaps with the recording layer and a single overcoat deposited on the disk for each recording surface.

The simplest structure, comprising a layer of WORM phase change media on a substrate with possibly only a simple single layer anti-reflective overcoat, is advantageous because of structure simplicity, wide tolerances such as layer thicknesses (not tuned), as well as insensitivity to wavelength (making future shorter-wavelength systems easily compatible). In particular, it is noted the response of InSbSn is very flat over the visible and near-infrared spectrum. Additionally, the tolerance to media tilt, substrate thickness and lack of substrate birefringence problems ease the drive design and enable higher storage densities through higher NA's. All of these features reduce the cost of the media and drive.

A number of variations and modifications of the invention can be used. It would be possible to provide for some features of the invention without providing others. For example, it is possible to provide an optical data storage cartridge which is removable, has a relatively small size and relatively large capacity without providing for writing on both sides of the disk. Although the cartridge of the present invention has been described in connection with a particular type of drive, it is possible to use the cartridge of the present invention in connection with other sizes, shapes, or techniques of drives.

Although the present invention has been described in the context of providing optical data storage for use in connection with digital cameras, the optical storage device and system of the present invention can also be used for other types of data storage including storing data for use by computers such as personal computers, laptops, work stations and the like, storage for music or other audio purposes, including storage for MP3 players, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the storage system and/or medium of the present invention in a wide variety of devices, e.g., to provide for ease of sharing, storing or transmitting of data, e.g., between platforms including, but not limited to devices for play-back, communication or reproduction of data (including, e.g., image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like. In one embodiment writeable media is provided in a grooved, pre-mastered form, preferably with embedded (e.g., molded) servo and data header information.

Although much of the description above was concerned with recording image data onto the medium, it is contemplated that digital cameras will commonly be used for viewing stored images (either stored by the same digital camera, or pre-recorded, e.g., mass-distributed pre-recorded media), and accordingly, the drive preferably provides both read and write capability. In general features, data or other information can be pre-provided (i.e., provided already on the disk when it is purchased by or otherwise provided to the end-user) by pre-recording (which generally involves sequential recording of a data stream or other information) or embedding (which generally involves providing some or all the data substantially simultaneously, such as by molding, stamping, printing, embossing and the like). In addition to pre-providing data (e.g., content, such as images, music, programs, and the like), in at least some embodiments, servo, formatting or other non-content, informational or supplemental features may be pre-provided (i.e., provided in or on the media as sold or distributed to the end user). Examples of such information or features include sector information or marks, track-following features, identification or characteristics information (such as data density or data format information, content identifiers and the like), test features such as read test patterns write test areas or cells, grooves and/or lands, other servo data and the like. Provision of format or servo information by a process of molding-in features or information (as opposed to recording the information) is referred to herein as hard-formatting. It is contemplated the pre-provided or pre-recorded media, according to embodiments of the present invention, will be mass-produced in a relatively rapid fashion, such as using a stamping, embossing or printing-like process to impart the desired pre-recorded data on a (preferably first-surface media) disk, which is then mounted in a cartridge. Thus one advantage of the present invention over devices such as video or audio tape devices is that pre-recorded data can be reproduced substantially all-at-once (as opposed to sequentially). Any of a variety of kinds of data can be pre-provided and stored or distributed using the devices and techniques of the present invention, including, but not limited to still images, video, motion pictures, music, voice data, computer programs and/or data, personal information or data such as identification, password or encryption/decryption data, and the like. The cartridges are then mass-distributed. The pre-provided or pre-recorded media preferably can be used in either read-write equipment (e.g., a digital camera), or read-only equipment, such as drives which have only a low-power laser capability (insufficient to write data on a disk). It is contemplated such read-only devices may be part of, or coupled to, any of a variety of personal electronic devices, or other electronic devices, including, but not limited to devices for play-back, communication or reproduction of data (including, e.g., image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

It is further contemplated that some or all features of the present invention can be used in connection with media and/or drives which are configured to be re-writeable. Drives configured to provide re-writeability may be configured to erase previously-written data either in a separate erase pass over the data, or "on the fly," substantially as (or just before) the new data is written. It is contemplated that re-writeability may be particularly useful in connection with applications involving data which changes often, such as personal, and/or credit or other financial data, certain types of computer data, and the like. Although it would be advantageous to provide for compatibility of various types of media with various types of drives, it is possible there may be some degree of incompatibility, e.g., it may be that a re-writeable disk can not be read by certain read-only drives, and the like.

Although the figures illustrate one possible orientation of the cartridge and drive, with the disk horizontal, and the optics drawn below the disk, the device can be otherwise oriented, e.g., with the disk vertical angled, and/or the arm above or lateral to the disk. Although an embodiment has been described in which the cartridge is used in connection with a drive having an actuator for reading or writing on one surface of the disk at a time (so that, recording on an opposite surface involves removing, rotating and reinserting the cartridge) it is also possible to configure a drive with two actuator arms, one for writing on each surface, such that read/write can be performed on both surfaces without the need for rotating the disk and/or can be performed on both surfaces at the same time. Although a tube-shaped optical arm and a u-shaped or channel arm are depicted, other structures are possible, such as an open cage or framework, a rod, a polygonal cross-sectional shape and the like. Although embodiments of the present invention have described providing a single actuator arm for writing on a given surface of the disk, it is also possible to configure a drive which provides two or more different actuator arms for writing on the same surface of the disk, e.g., to improve transfer rates, access times and the like. Although a substantially arcuate window in the cartridge surface has been described, it is also possible to provide other sizes or shapes of windows such as providing a larger window, since making the window larger will still provide the access minimally required to the disk. Although the drive has been described as substantially enclosed by a housing or chassis, baseplate and cover 214, 212, 216, it is possible to provide the drive in a substantially open (unenclosed) configuration, e.g., if it is intended to be normally non-removably housed in a larger structure, such as a digital camera In one embodiment one or more circuit boards provide the main rigid structure, to which other components are coupled. Although write-once media are described, and may be preferred for some purposes (to avoid the potential for accidental data loss), some or all aspects of the present invention can also be used in connection with re-writeable media (many re-writeable media use phase-change recording materials, and, as noted above, at least some media presently preferred in the present invention are also phase change media).

Although digital cameras are discussed in the context of storing image information, it is possible to use the data storage system and medium described herein, within digital cameras, for storing other items (exclusively, or in combination with image or other information), such as audio recorded near the time the images are taken, date, time, location, frame number, image recording parameters (f-stop and the like) and similar information, e.g., to identify the images, and the like.

Figure 26:
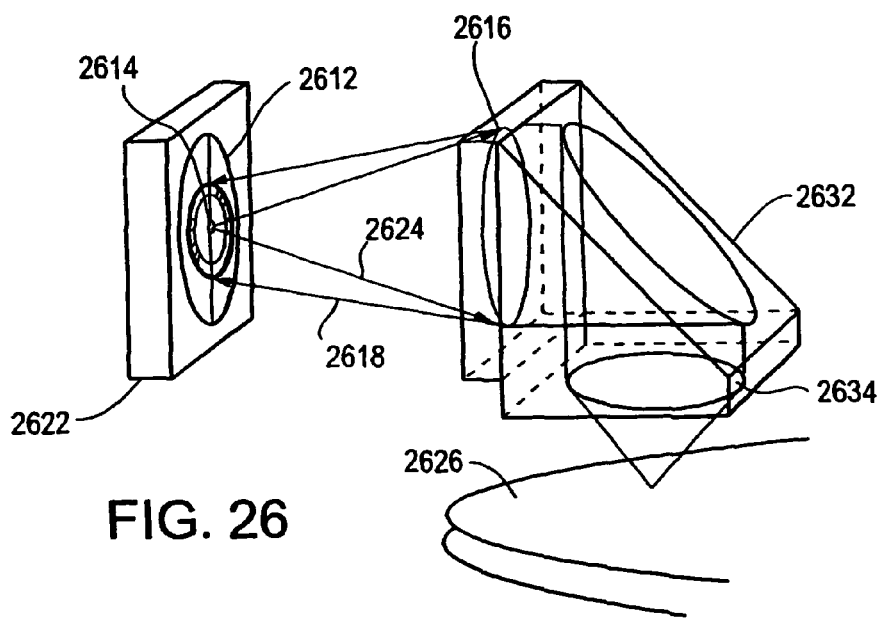
FIG. 26 is a schematic perspective view of an optics configuration with coaxial detectors, according to an embodiment of the present invention.

Although an embodiment is depicted in which the laser source is laterally displaced from the detector, as depicted in FIG. 26, it is also possible to construct an operable device in which the detector, such as a Φ detector 2612, coaxially surrounds the laser source, such as a VCSEL 2614, preferably integrated therewith. Such a coaxial device can eliminate the need for devices and procedures for laterally offsetting the reflected beam. In the depicted embodiment a diffractive collimator/torus lens 2616 is provided, such as being coupled to (or integrated with) the turning prism 2632 and objective 2634. The collimator/torus lens 2616 is positioned and configured such that the reflected beam 2618 is wider, upon arrival at the laser/detector chip 2622, than the outgoing beam 2624 emitted by the laser 2614. Accordingly, sufficient power from the reflected beam 2618 falls on the coaxial detector 2612 that the data on the disk 2626 can be read, and usable focus and tracking signals can be obtained. Further, only a relatively small portion of the reflected beam 2618 reaches the laser 2614, helping to avoid feedback or other undesired effects. Although the presence of the collimator/torus lens 2616 may create a ring about the read/write spot, relatively little power (such as about 10%) is in the ring, so that there is little unwanted effect.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An optical medium within a cartridge comprising:
a first-surface optical medium including:
a single substrate having first and second principal surfaces;
a phase change recording layer overlaying the first principal surface of the substrate, wherein the phase change layer comprises TeO or a chalcogenide alloy;
an anti-reflective layer overlaying the phase change recording layer, the anti-reflective laying having a thickness of less than 50 nm, the first-side optical data storage disk being distinguished from second-surface optical disks by the absence of any additional layers overlaying the anti-reflective layer; and
a cartridge body, with said first-surface optical medium positioned therein.

2. The optical medium within a cartridge as claimed in claim 1 wherein said cartridge body includes at least an arcuate window region covered by a plate which is transparent at a first wavelength.

3. The optical medium within a cartridge as claimed in claim 1 wherein said cartridge body is configurable between a first configuration substantially enclosing the first-surface optical medium and a second configuration exposing a portion of the first-surface optical medium for reading and writing on the first-surface optical medium.

4. The optical medium within a cartridge as in claim 3 wherein said cartridge comprises a window for exposing a portion of the first-surface optical medium and a first shutter movable from a first position wherein said cartridge is in said first configuration to a second position when said cartridge is in said second configuration.

5. The optical medium within a cartridge as claimed in claim 4 wherein said window has a transverse extent sufficient to accommodate at least partial insertion of an objective end of an optics arm through said window.

6. The optical medium within a cartridge as claimed in claim 1 further comprising a plurality of recesses formed in an edge surface of said cartridge for encoding characteristics of said medium.

* * * * *